US011272082B2

(12) United States Patent
Miller et al.

(10) Patent No.: US 11,272,082 B2
(45) Date of Patent: Mar. 8, 2022

(54) MULTI-CAMERA MOUNTING CHASSIS

(71) Applicant: Apple Inc., Cupertino, CA (US)

(72) Inventors: Scott W. Miller, Los Gatos, CA (US); Brian A. Argyres, Palo Alto, CA (US); Lindsay M. Alanen, San Jose, CA (US); Matthew D. Hill, Santa Clara, CA (US); Nicholas D. Smyth, San Jose, CA (US); Shujun Tang, Santa Cruz, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/023,938

(22) Filed: Sep. 17, 2020

(65) Prior Publication Data

US 2021/0092261 A1    Mar. 25, 2021

Related U.S. Application Data

(60) Provisional application No. 62/904,589, filed on Sep. 23, 2019.

(51) Int. Cl.
*H04N 5/225* (2006.01)
*G03B 13/36* (2021.01)

(52) U.S. Cl.
CPC ........... *H04N 5/2252* (2013.01); *G03B 13/36* (2013.01); *H04N 5/2257* (2013.01)

(58) Field of Classification Search
CPC .............. H04N 5/2252; H04N 5/2257; H04N 5/22521; H04N 5/2253; H04N 5/2258; G03B 13/36
See application file for complete search history.

(56) References Cited

U.S. PATENT DOCUMENTS

| 9,591,215 | B1* | 3/2017 | Miller | H04N 5/2257 |
| 9,838,600 | B1 | 12/2017 | Tam et al. | |
| 10,573,776 | B2 | 2/2020 | Jan et al. | |
| 2014/0048997 | A1* | 2/2014 | Cheng | H04N 5/2253 |
| | | | | 269/303 |
| 2016/0142596 | A1 | 5/2016 | DePaschoal | |
| 2017/0146766 | A1* | 5/2017 | Hsu | H04N 5/2253 |
| 2018/0067379 | A1* | 3/2018 | Rho | G03B 3/10 |
| 2018/0275368 | A1* | 9/2018 | Lee | G03B 3/10 |
| 2019/0064471 | A1* | 2/2019 | Chang | H04N 5/2254 |
| 2019/0067363 | A1 | 2/2019 | Jan et al. | |
| 2019/0141220 | A1 | 5/2019 | Chen et al. | |

FOREIGN PATENT DOCUMENTS

| CN | 102943948 | 2/2013 |
| WO | 2018171446 | 9/2018 |

OTHER PUBLICATIONS

Office action and Search Report from Chinese Application No. 2020110011629, dated Nov. 3, 2021, (English Translation and Chinese Version), pp. 1-18.

* cited by examiner

*Primary Examiner* — Padma Haliyur
(74) *Attorney, Agent, or Firm* — Robert C. Kowert; Kowert, Hood, Munyon, Rankin & Goetzel, P.C.

(57) ABSTRACT

Various embodiments include a chassis for a multi-camera system and techniques for forming such a chassis. The chassis may comprise multiple chassis portions that define cavities for mounting cameras. Some embodiments include a chassis portion comprising an integrated shield can-chassis that may be formed as a single component. According to some embodiments, subtractive manufacturing may be used to form one or more features of the chassis.

21 Claims, 10 Drawing Sheets

MULTI-CAMERA MOUNTING CHASSIS

This application claims benefit of priority to U.S. Provisional Application No. 62/904,589, filed Sep. 23, 2019, titled "Multi-Camera Mounting Chassis", which is hereby incorporated by reference in its entirety.

BACKGROUND

Technical Field

This disclosure relates generally to a chassis for a multi-camera system.

Description of the Related Art

The advent of small, mobile multipurpose devices such as smartphones and tablet or pad devices has resulted in a need for high-resolution, small form factor cameras for integration in the devices. Some cameras may incorporate optical image stabilization (OIS) mechanisms that may sense and react to external excitation/disturbance by adjusting location of the optical lens on the X and/or Y axis in an attempt to compensate for unwanted motion of the lens. Furthermore, some cameras may incorporate an autofocus (AF) mechanism whereby the object focal distance can be adjusted to focus an object plane in front of the camera at an image plane to be captured by the image sensor. In some such AF mechanisms, the optical lens is moved as a single rigid body along the optical axis of the camera to refocus the camera.

BRIEF DESCRIPTION OF THE DRAWINGS

FIG. 1A shows a bottom perspective view of the system. FIG. 1B shows a bottom view of the system. FIG. 1C shows a bottom perspective view of the chassis. FIG. 1D shows a top view of the chassis. FIG. 1E shows another top view of the chassis, and illustrates an example cover foam that may be placed on a surface of the chassis in some embodiments.

FIG. 2B includes a schematic overlay of an example thermal conduction path along which heat may be dissipated, in accordance with some embodiments.

Figure 1A:
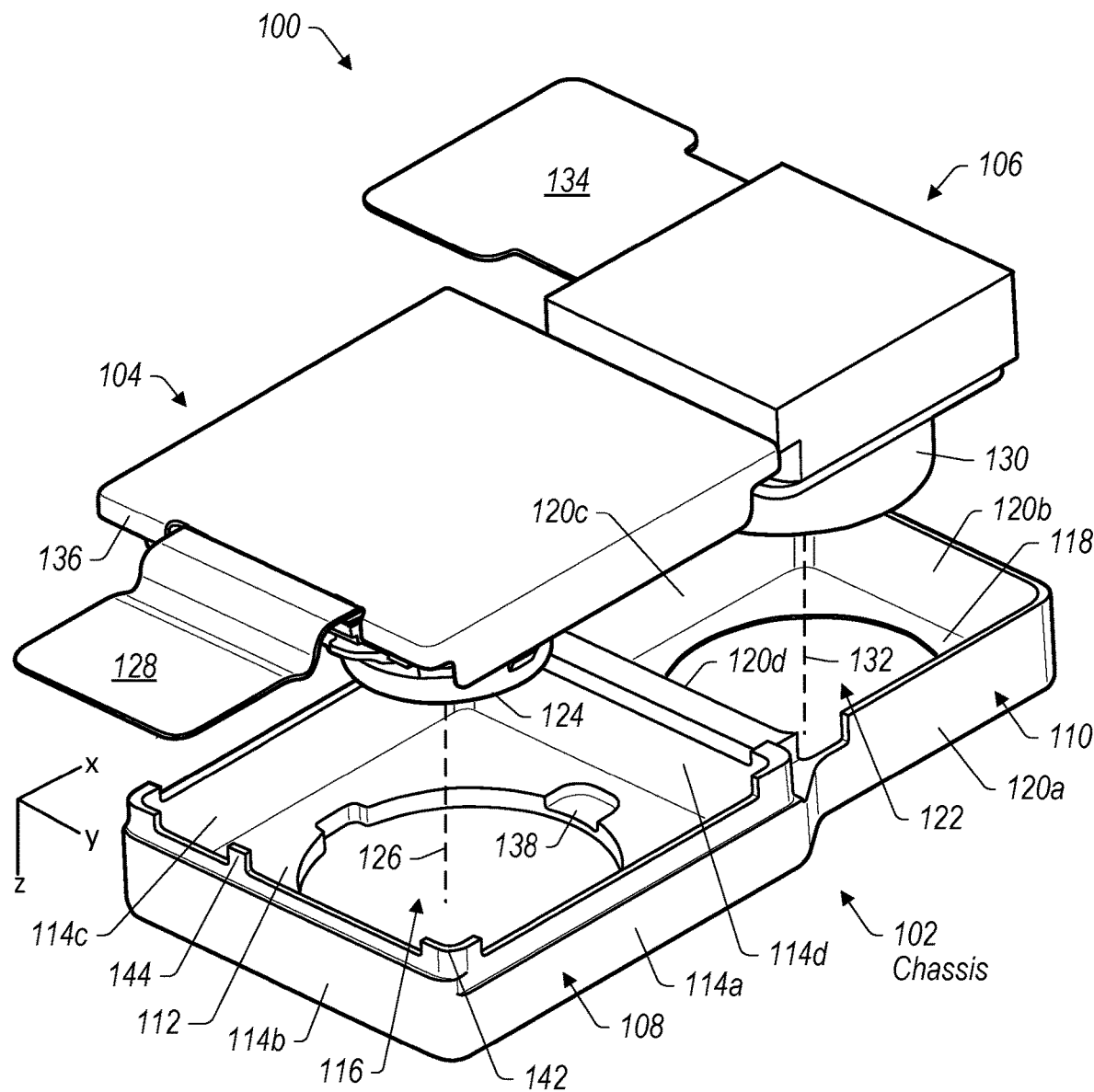
FIGS. 1A-1E illustrate views of an example system that includes an example chassis for mounting multiple cameras, in accordance with some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

DETAILED DESCRIPTION

Various embodiments described herein relate to a chassis for use in conjunction with multiple cameras. In some examples, the chassis may provide a unitary body structure to which cameras may be attached or otherwise coupled, e.g., to form a multi-camera system module that may be incorporated into a device, such as a phone or other computing device. The chassis may comprise multiple chassis portions that each define a respective cavity for mounting a respective camera. For example, the chassis may comprise a first chassis portion to which a first camera is attached, and a second chassis portion to which a second camera is attached. The chassis may enable a reduced size of the system by integrating (e.g., into a monolithic component) that which in other systems may be multiple components. As a non-limiting example, one or more of the chassis portions may be shaped to serve as both a shield can (e.g., for a voice coil motor (VCM) actuator module of a camera) and a camera chassis (e.g., for supporting the camera in a multi-camera system), thus eliminating the need for a shield can that would otherwise be included as a separate component in some other systems.

According to various embodiments, the chassis may include one or more features, such as recess(es), pocket(s), cut-out(s), protrusion(s), variation(s) in wall thickness, etc. In some embodiments, such features may be realized by removing material (e.g., using a computer numerical control (CNC) machine) from a single piece of material (e.g., metal) to form a monolithic chassis that includes the features. Such features may be designed to, among other things, reduce overall system size, improve thermal performance (e.g., by shortening a thermal conduction path), reduce stray light risk (e.g., by reducing aperture size so as to reduce excess light ingress), simplify manufacturing (e.g., by reducing part count and/or eliminating process steps), improve structural integrity (e.g., by increasing stiffness of the chassis at portions with increased wall thickness), and/or accommodate particular camera profiles (e.g., based on design constraints and/or requirements), as discussed in further detail below.

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, components, circuits, and networks have not been described in detail so as not to unnecessarily obscure aspects of the embodiments.

As mentioned above, various embodiments include a chassis for mounting multiple cameras. FIGS. 1A-1E illustrate views of an example system 100 that includes an example of such a chassis 102 for mounting cameras. According to various embodiments, the chassis 102 may include one or more features (e.g., recess(es), pocket(s), cut-out(s), protrusion(s), and/or variation(s) in wall thickness, etc.) designed to, among other things, reduce overall system size, improve thermal performance (e.g., by shortening a thermal conduction path, as discussed herein with reference to FIG. 2B), reduce stray light risk (e.g., by reducing aperture size so as to reduce excess light ingress), simplify manufacturing (e.g., by reducing part count and/or eliminating process steps), improve structural integrity (e.g., by increasing stiffness of the chassis), and/or accommodate particular camera profiles (e.g., based on design constraints and/or requirements), as discussed herein. The example X-Y-Z coordinate system shown in FIG. 1A is used to discuss aspects of systems and/or system components, and may apply to embodiments described throughout this disclosure.

According to various embodiments, the system 100 may include the chassis 102, a first camera 104, and a second camera 106. The chassis 102 may include multiple respective portions to which respective cameras may be coupled. For example, the chassis 102 may include a first chassis portion 108 for mounting the first camera 104, and a second chassis portion 110 for mounting the second camera 106.

Figure 1B:
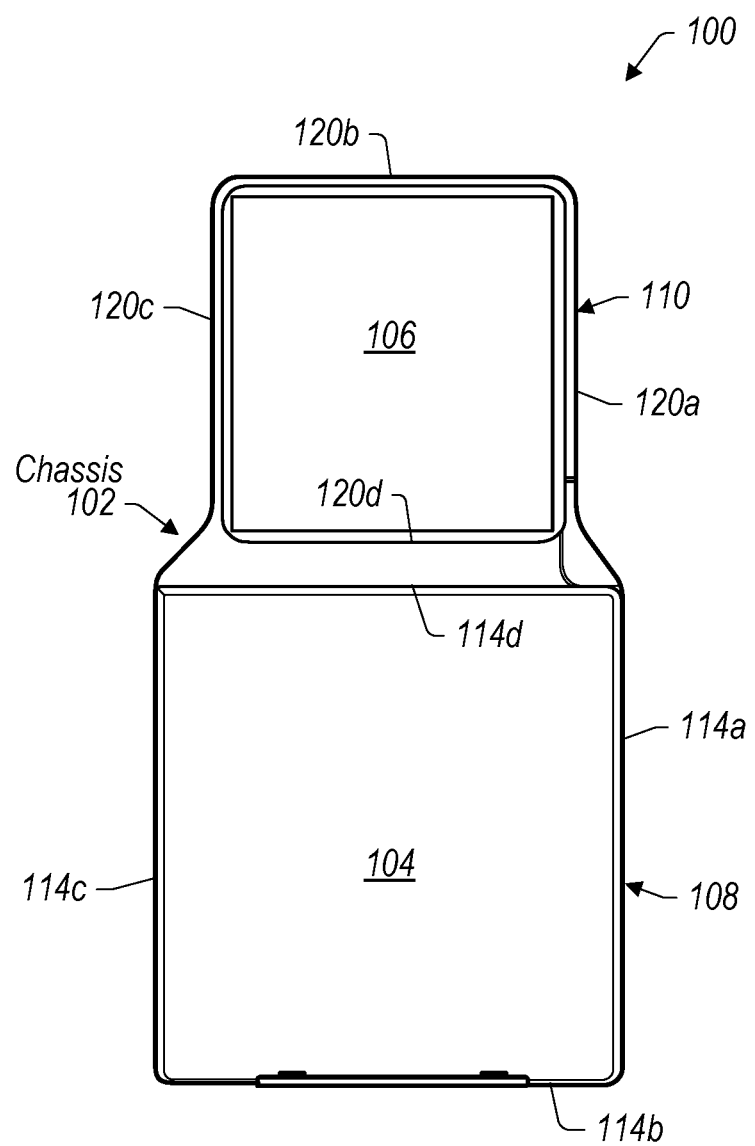

In some embodiments, the first chassis portion 108 may include a first top wall 112 and a first set of side walls (e.g., side walls 114a-114d). The first top wall 112 may define a first aperture 116. The first set of side walls may extend from the top wall 112. The first top wall 112 and the first set of side walls may define a first cavity for receiving at least a portion (e.g., a top portion) of the first camera 104, e.g., as indicated in FIGS. 1A-1B. The first chassis portion 108 may partially encase the first camera 104 when the first camera 104 is mounted to the chassis 102. The first set of side walls may include exterior side walls 114a-114c and an interior side wall 114d. According to some embodiments, the interior side wall 114d may extend from exterior side wall 114a to exterior side wall 114c (which is opposite exterior side wall 114a). Furthermore, in some embodiments, the interior side wall 114d may have a different wall thickness relative to at least one of the exterior side walls 114a-114c. In various embodiments, the interior side wall 114d may be shared by the first chassis portion 108 and the second chassis portion 110.

In some embodiments, the second chassis portion 110 may include a second top wall 118 and a second set of side walls (e.g., side walls 120a-120d). The second top wall 118 may define a second aperture 122. The second set of side walls may extend from the second top wall 118. The second top wall 118 and the second set of side walls may define a second cavity for receiving at least a portion (e.g., a top portion) of the second camera 106, e.g., as indicated in FIGS. 1A-1B. The second chassis portion 110 may partially encase the second camera 106 when the second camera 106 is mounted to the chassis 102. The second set of side walls may include exterior side walls 120a-120c and an interior side wall 120d. According to some embodiments, the interior side wall 120d may extend from exterior side wall 120a to exterior side wall 120c (which is opposite exterior side wall 120a). Furthermore, in some embodiments, the interior side wall 120d may have a different wall thickness relative to at least one of the exterior side walls 120a-120c. As indicated above, the interior side wall 120d may be shared by the first chassis portion 108 and the second chassis portion 110. For example, the interior side wall 120d of the second chassis portion 110 may be the same wall as the interior side wall 114d of the first chassis portion 108. For simplicity of discussion, the interior side wall, that is shared by the first chassis portion 108 and the second chassis portion 110, may also be referred to herein as the "shared interior side wall 114d, 120d".

The shared interior side wall 114d, 120d may be located between the first cavity and the second cavity. In some examples, a first surface of the shared interior side wall 114d, 120d may at least partially delimit the first cavity, and a second surface (e.g., a surface facing opposite the first surface) of the shared interior side wall 114d, 120d may at least partially delimit the second cavity. According to some embodiments, the shared interior side wall 114d, 120d may be a solid wall between the first surface and the second surface. In some examples, the shared interior side wall 114d, 120d may comprise multiple different portions that respectively extend in the Z-axis direction by different amounts. For example, the shared interior side wall 114d, 120d may include a first portion that is closer to the first chassis portion 108 (than to the second chassis portion 110) and that extends more in the Z-axis direction than a second portion (of the shared interior side wall 114d, 120d) that is closer to the second chassis portion 110 (than to the first chassis portion 108), or vice-versa. In various embodiments, the geometry of the shared interior side wall 114d, 120d may be determined based at least in part on design constraints and/or design requirements with respect to one or more of the cameras and/or the overall system, such as relative placement of the cameras when mounted to the chassis 102, location and/or size of injection points for adhesive, and/or stiffness of the chassis 102, etc.

In some embodiments, the first top wall 112 may have a different wall thickness relative to the second top wall 118. As a non-limiting example, the first top wall 112 may be thicker than the second top wall 118, as indicated in FIG. 1A. In some embodiments, the top walls having different relative wall thicknesses may allow for the first camera 104 to be placed at a different height (e.g., in the Z-axis direction) relative to the second camera 106. The first top wall 112 may be parallel to the second top wall 118 in various examples.

As indicated in FIG. 1A, the first camera 104 may include a first lens barrel 124 that holds one or more lens elements (not shown). The lens element(s) may define a first optical axis 126. In some embodiments, the first lens barrel 124 may be at least partially disposed within the first aperture 116 when the first camera 104 is mounted to the chassis 102. Furthermore, the first camera 104 may include a first flex circuit 128 that conveys electrical signals (e.g., power and/or control signals) from one or more components to one or more other components. Similarly, the second camera 106 may include a second lens barrel 130 that holds one or more lens elements (not shown). The lens element(s) may define a second optical axis 132. In some embodiments, the second lens barrel 130 may be at least partially disposed within the second aperture 122 when the second camera 106 is mounted to the chassis 102. Furthermore, the second camera 106 may include a second flex circuit 134 that conveys electrical signals (e.g., power and/or control signals) from one or more components to one or more other components. The first camera 104 and/or the second camera 106 may include various other components (e.g., image sensor(s), substrate(s), actuator(s), etc.), some of which are discussed with reference to FIGS. 2A-2B.

In various embodiments, the system 100 may include one or more stiffeners that provide structural support to the first camera 104 and/or the second camera 106. For example, as indicated in FIG. 1A, a stiffener 136 may at least partially encase multiple sides of the first camera 104. As will be discussed in further detail below with reference to FIGS. 2A-2B, the stiffener 136 may include a base portion and one or more end portions. The end portion(s) may extend from the base portion and be oriented at a respective non-zero angle relative to the base portion. In various embodiments, each of one or more exterior side walls may define a respective recess for receiving a respective end portion of the stiffener 136, e.g., to connect the stiffener 136 to the chassis 102.

In a non-limiting example, exterior side wall 114a may define a first recess within which at least part of a first end portion of the stiffener 136 may be disposed, and exterior side wall 114c may define a second recess within which at least part of a second end portion of the stiffener 136 may be disposed. The first end portion and the second end portion may be connected to the chassis 102 at the first recess and the second recess, respectively, e.g., via an adhesive (not shown) disposed within the first recess and the second recess. In this example, a third end portion of the stiffener 136 may extend proximate a portion of exterior side wall 114b, and/or a fourth end portion of the stiffener 136 may extend proximate a portion of exterior side wall 114d. Furthermore, the third end portion of the stiffener 136 may be spaced apart from exterior side wall 114b by a gap, and/or the fourth end portion of the stiffener 136 may be spaced apart from exterior side wall 114d by a gap. As discussed herein with reference to FIG. 2B, some such arrangements for connecting a stiffener (e.g., stiffener 136) to a chassis (e.g., monolithic chassis 102) may shorten a thermal conduction path and improve thermal performance of the system.

As previously noted, one or more chassis portions may be shaped to serve as both a shield can and a camera chassis. As a non-limiting example, the chassis 102 may integrate a shield can and a chassis—which in other systems may be separate components that are attached to each other and/or to other components—into a monolithic component such as the first chassis portion 108 shown in FIGS. 1A-1E. In various embodiments, certain manufacturing process(es) may be used to enable the formation of an integrated shield can-chassis portion (e.g., the first chassis portion 108) of the chassis 102 and/or other features of the chassis 102. For example, one or more subtractive manufacturing processes may be used to form such features by removing material, e.g., from a piece of material.

By integrating the shield can and the chassis into one component, the size of the system 100 may be reduced. As a non-limiting example, an adhesive layer that would be used to attach the shield can to the chassis in some other systems, and that is eliminated in the system 100 due to the integration of the shield can and the chassis into one component, may enable a reduction in system dimension(s) in the X-axis and/or Y-axis direction(s). Furthermore, embodiments disclosed herein may improve the assembly process by reducing part count (e.g., by eliminating the separately formed shield can) and/or by eliminating a gluing assembly step that would be used to attach the separately formed shield can to the chassis in other systems.

In some examples, the use of subtractive manufacturing to form the chassis 102 may remove one or more constraints on material selection. For example, deep drawability may be a constraint that limits the materials that are considered in some other systems such as those in which the shield can and the shield can are separately formed via deep drawing. With such constraint(s) removed by using subtractive manufacturing, embodiments disclosed herein may allow for the consideration of a wider selection of materials.

The integration of multiple components into a single component and/or the use of subtractive manufacturing, in accordance with some embodiments disclosed herein, may enable the formation of one or more other features of the chassis 102 that may not be feasible in some other systems. For example, in some other systems in which deep drawn components are separately formed from respective sheets of material, the deep drawn components and/or the sheets of material may not provide sufficient material to form certain features in one or more regions of the material, e.g., a pocket formed in a top wall as discussed below.

Figure 1C:
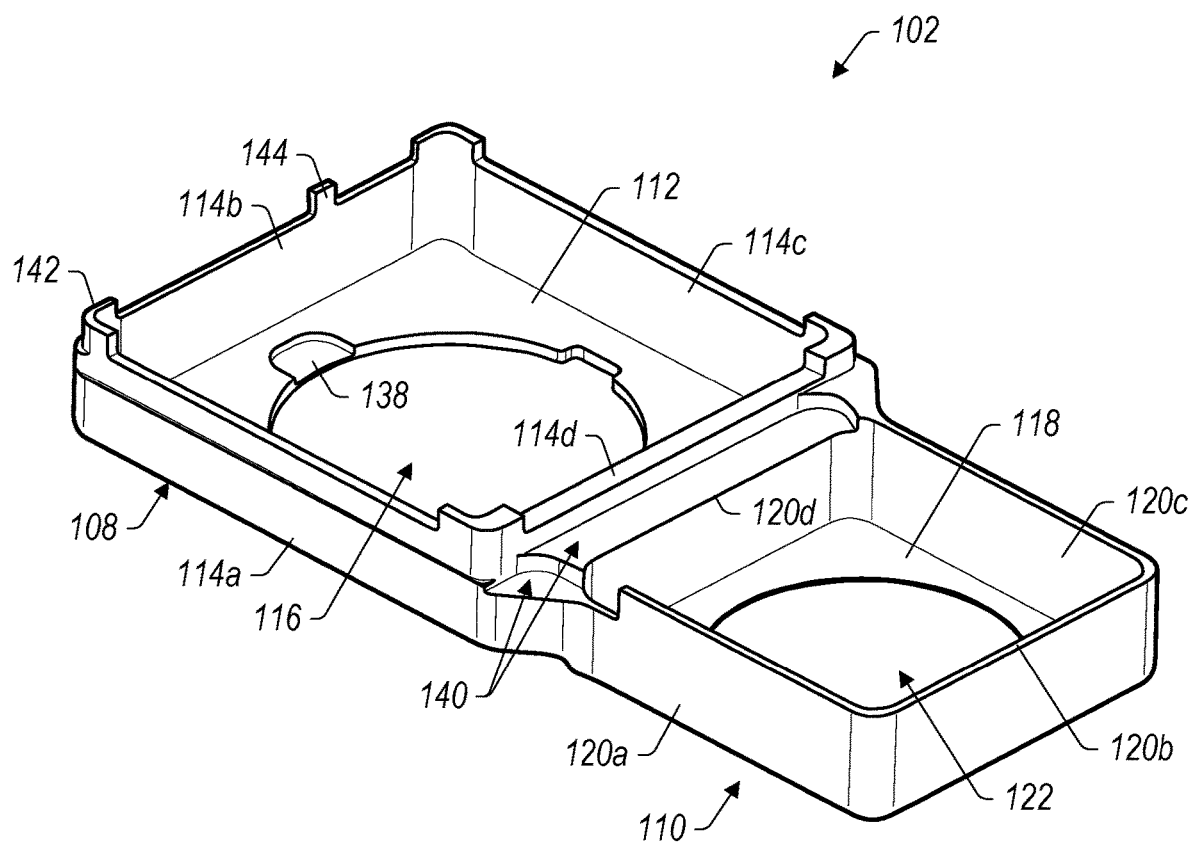

In some embodiments, one or more of the top walls of the chassis 102 may define one or more pockets. For example, as shown in FIGS. 1A and 1C, one or more interior surfaces of the first top wall 112 may define one or more pockets 138. The interior surface(s) may be opposite at least one exterior surface of the first top wall 112. For example, an interior surface of the first top wall 112 may face towards an image sensor of the first camera 104, and an exterior surface may of the first top wall 112 may face away from the image sensor, such that the interior surface and the exterior surface face opposite directions. According to some embodiments, the pocket(s) 138 may be sized to accommodate at least a portion of an actuator (e.g., the actuator described herein with reference to FIGS. 2A-2B) of the first camera 104. The actuator may be configured to move a lens group and/or an image sensor of the first camera 104 in some embodiments. In some examples, the exterior surface(s) of the first top wall 112 may block light from passing to the image sensor via the pocket(s) 138.

According to various embodiments, the integration of the shield can and the chassis into a single component and/or the use of certain manufacturing process(es) (e.g., subtractive manufacturing) may enable formation of the pocket(s) 138 in the first top wall 112. In some other systems (e.g., one in which deep drawn components are separately formed from respective sheets of material), the formation of cut-out portions (instead of pocket(s) 138) that extend completely through a top wall may be required to accommodate the same component(s) (e.g., one or more portions of the actuator), which may effectively increase the size of an aperture and/or window on the top wall or otherwise increase the amount of light that may pass through the top wall to the image sensor, as compared to embodiments of the system 100 disclosed herein. Furthermore, by enabling a reduction in size of the first aperture 116, the formation of the pocket(s) 138 in the first top wall 112 may enable a tighter fit between the first lens barrel 124 and the first aperture 116, which may improve sealing in that region and/or reduce a particle ingress path, e.g., as compared to other systems that require cut-out portions on a top wall to accommodate the actuator.

In some embodiments, the chassis 102 may include one or more regions that vary in thickness and/or that have a different thickness relative to one or more other regions of the chassis 102. Additionally, or alternatively, one or more regions of the chassis 102 may have a respective thickness that provides a desired amount of stiffness (e.g., torsional and/or bending stiffness). In some embodiments, subtractive manufacturing may enable forming such region(s) of the chassis 102 to various thicknesses in accordance with design constraints and/or requirements. For example, as noted above, the geometry of the shared interior side wall 114*d*, 120*d* may be determined based at least in part on design constraints and/or design requirements with respect to one or more of the cameras and/or the overall system, such as relative placement of the cameras when mounted to the chassis 102, location and/or size of injection points for adhesive, and/or stiffness of the chassis 102, etc.

In a non-limiting example, the shared interior side wall 114*d*, 120*d* may define one or more pockets (e.g., one or more of the pockets indicated by arrows 140 in FIG. 1C) that provide location(s) at which adhesive may be injected to be introduced to gaps between surfaces disposed within the first cavity (defined by the first portion 108) and/or the second cavity (defined by the second portion 110). In some embodiments, the pocket(s) 140 may be sized to accommodate at least a portion of a needle used to inject the adhesive. Additionally, or alternatively, the pocket(s) 140 may be configured to provide a path along which the adhesive may flow to one or more desired locations.

In some embodiments, one or more chassis portions may comprise one or more corner protrusions each extending from a respective corner. As a non-limiting example, the first chassis portion 108 may have four corner protrusions 142 as indicated in FIGS. 1A and 1C. Each of the corner protrusions 142 may extend from a respective corner formed by a respective pair of adjacent side walls. In some embodiments, subtractive manufacturing may be used to form a corner protrusion 142 having an interior radius that is different than an exterior radius. However, the internal radius and the external radius of the corner protrusion 142 may be the same (or similar) in various embodiments. Additionally, or alternatively, the respective internal radius and/or external radius of one or more corner protrusions 142 may be the same as, similar to, and/or different than the respective internal radius and/or external radius of one or more other corner protrusions 142 in some embodiments. Additionally, or alternatively, the respective wall thickness of one or more corner protrusions 142 be the same as, similar to, and/or different than the respective wall thickness of one or more other corner protrusions 142 in some embodiments.

According to some embodiments, one or more chassis portions may include one or more grounding tabs, such as the grounding tab 144 shown in FIGS. 1A and 1C. The grounding tab 144 may extend from exterior side wall 114*b* and an end portion of the grounding tab 144 may be connected to one or more components of the first camera 104 and/or the system 100 to provide at least a portion of an electrical grounding path.

Figure 1D:
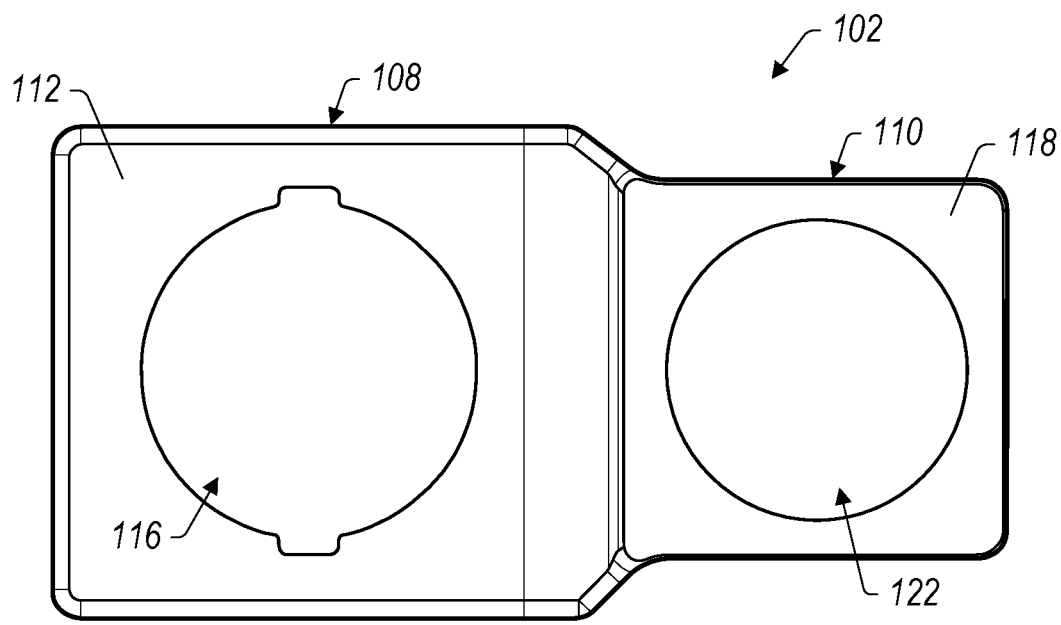
Figure 1E:
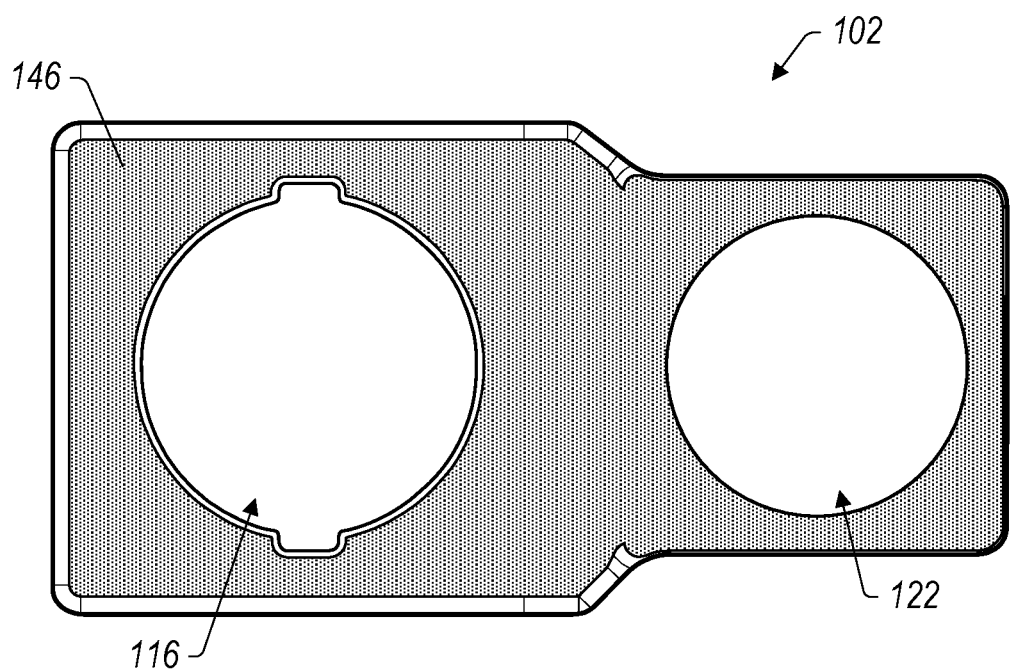

FIG. 1D shows a top view of the chassis 102 with the first top wall 112 and the second top wall 118 uncovered. FIG. 1E indicates that a cover foam 146 may cover the first top wall 112 and the second top wall 118. In some embodiments, the cover foam 146 may be placed between top exterior surfaces of the chassis 102 and one or more other components located external to the system 100. The cover foam 146 may provide protection to the system 100 in certain cases, e.g., by functioning as a damper that mitigates damage from an impact in a drop event.

Various embodiments of the example system 100 shown in FIGS. 1A-1E may be described herein as having two chassis portions: the first chassis portion 108 and the second chassis portion 110. However, it is contemplated that the system 100 may include more than two chassis portions in some embodiments. As a non-limiting example, the system 100 may include a third chassis portion (not shown) in addition to the first chassis portion 108 and the second chassis portion 110. A chassis having three chassis portions may be T-shaped in some embodiments. One or more of the chassis portions may be an integrated shield can-chassis portion like the first chassis portion 108 described herein. The system 100 may not include a separately formed shield can between the first chassis portion 108 (and/or other integrated shield can-chassis portions) and the first camera 104 (and/or other cameras corresponding to other integrated shield can-chassis portions).

In various embodiments, the first camera 104 may be different than the second camera 106 (and/or one or more other cameras of the system 100) with respect to one or more characteristics. As a non-limiting example, the first camera 104 may have a first focal length that is different than a second focal length of the second camera 106. As another non-limiting example, the first camera 104 may have a first field of view that is different than a second field of view of the second camera 106. In some embodiments, the first camera 104 may be a first camera module of a first size, and the second camera 106 may be a second camera module of a second size that is different (e.g., with respect to one or more dimensions) than the first size. In other embodiments, the first camera 104 and the second camera 106 may be the same (or similar) in size and/or other characteristics (e.g., focal length, field of view, etc.).

Figure 2A:
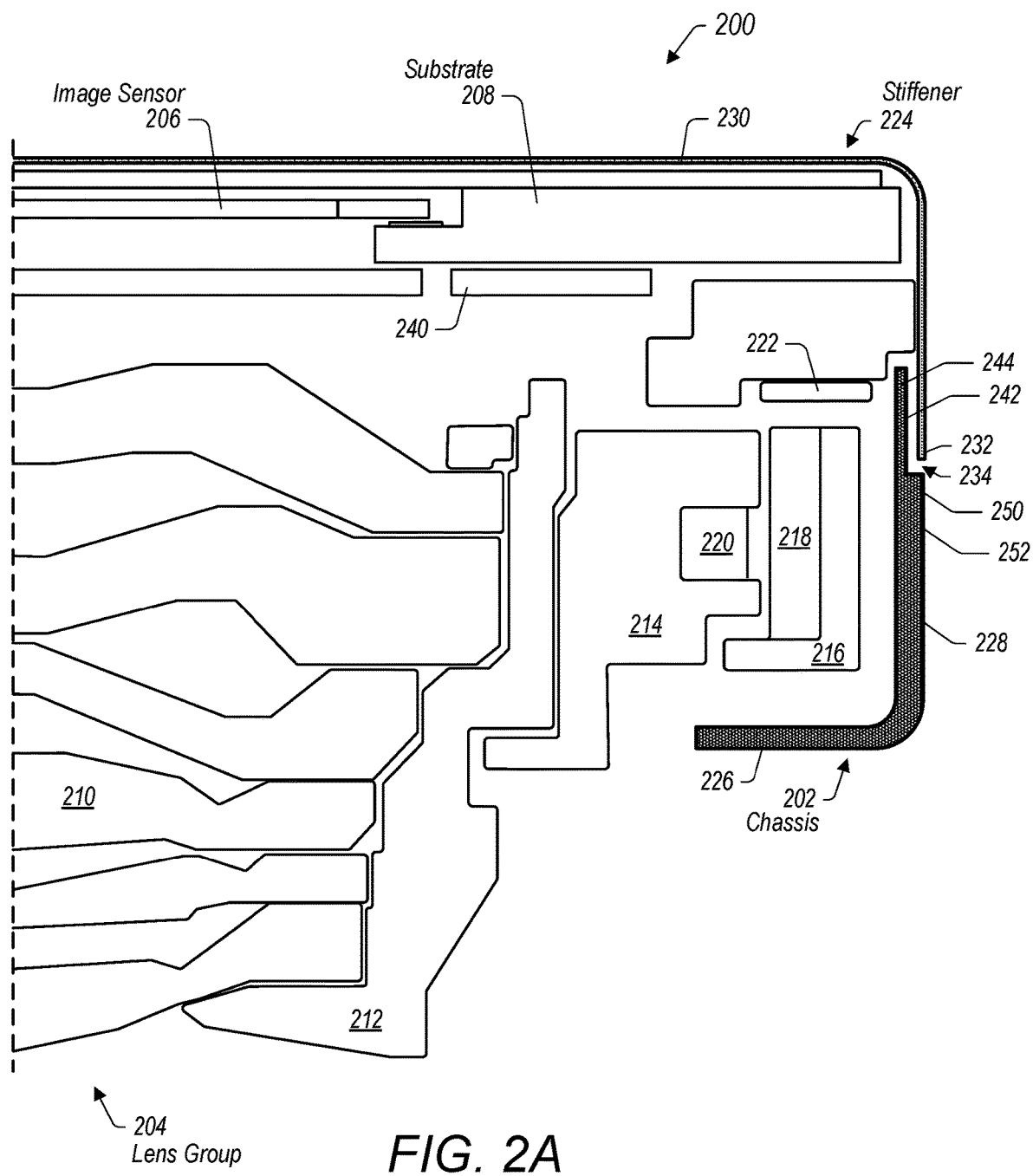
FIGS. 2A-2B illustrate cross-sectional views of an example system that includes a camera mounted in a portion of a chassis, in accordance with some embodiments.
Figure 2B:
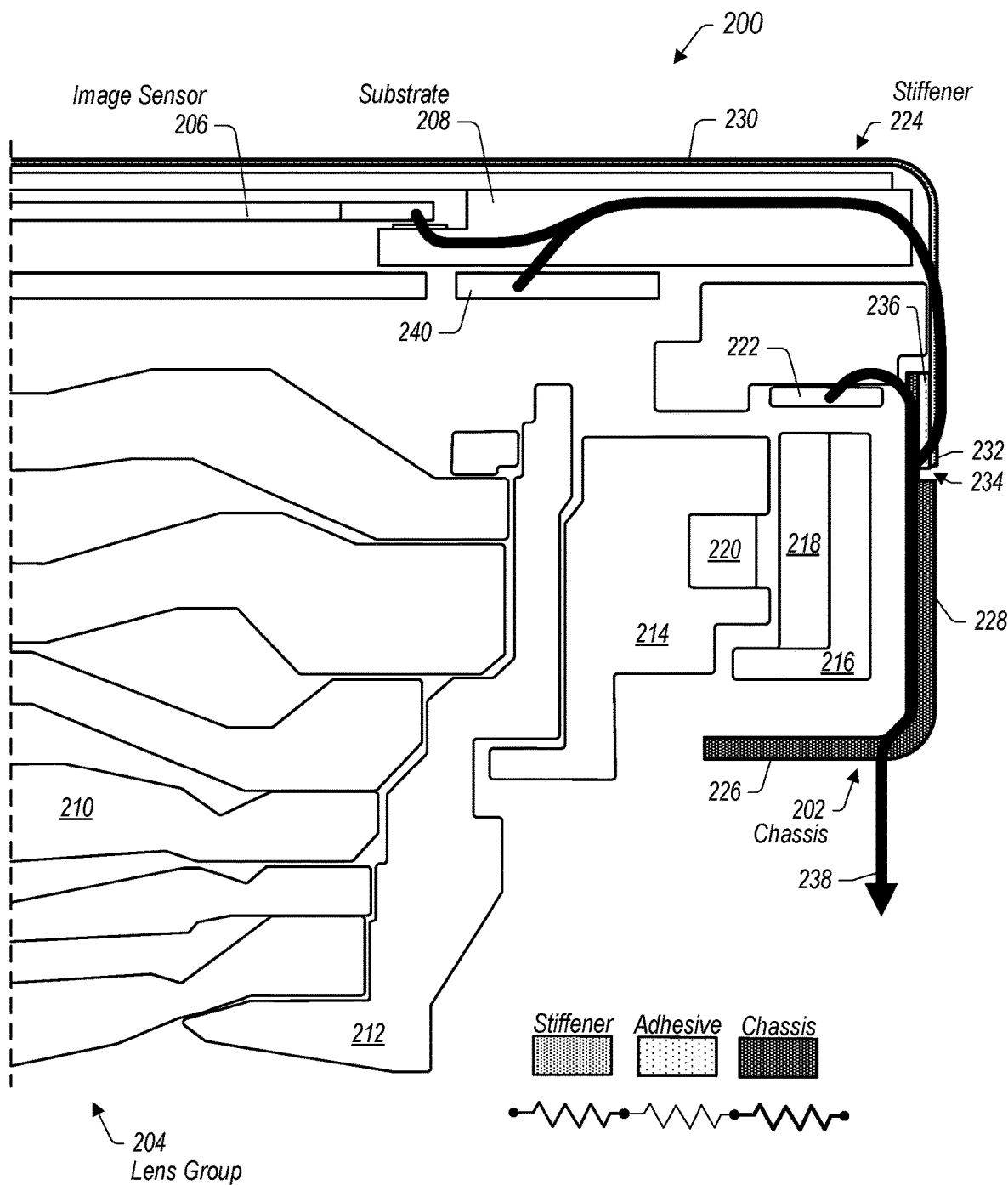

FIGS. 2A-2B illustrate cross-sectional views of an example system 200 that includes a camera mounted in a portion of a chassis 202, in accordance with some embodiments. In various examples, the chassis 202 may be the same as (or similar to) the chassis 102 described above with reference to FIGS. 1A-1E. According to various embodiments, the camera may include a lens group 204, an image sensor 206, a substrate 208, and/or an actuator. The lens group 204 may comprise one or more lens elements (e.g., lens element 210) that define an optical axis. The image sensor 206 may be configured to capture light that has passed through the lens group 204. The image sensor 206 may be attached to the substrate 208.

In some embodiments, the camera may include a lens barrel 212 within which the lens group 204 is held. Furthermore, in some embodiments, the camera may include a lens carrier 214 that is coupled with the lens barrel 212 and/or the lens group 204. For example, the lens carrier 214 may be coupled with the lens barrel 212 and/or the lens group 204 such that the lens carrier 214, the lens barrel 212, and/or the lens group 204 are movable (e.g., via the actuator) together (e.g., in lockstep).

According to various embodiments, the actuator may be configured to move the lens group 204 relative to the image sensor 206. Additionally, or alternatively, the actuator may be configured to move the image sensor 206 relative to the lens group 204. In various examples, the actuator may be used to provide autofocus (AF) and/or optical image stabilization (OIS) functionality. In some embodiments, the actuator may comprise a VCM actuator with an arrangement of one or more magnets and one or more coils. The magnet(s) may magnetically interact with the coil(s) to produce Lorentz forces that cause movement of one or more components of the camera, e.g., for AF and/or OIS purposes.

As indicated in FIGS. 2A-2B, the camera may include a magnet holder 216 to which one or more magnets 218 of the actuator may be attached. One or more AF coils 220 of the actuator may be attached to the lens carrier 214. The AF coil(s) may be located proximate the magnet(s) 218 so that they can magnetically interact, e.g., to provide AF movement (e.g., movement along the optical axis) of the lens group 204 relative to the image sensor 206. In some embodiments, the actuator may include one or more OIS coils 222 located proximate the magnet(s) 218 (e.g., below the magnet(s) 218) so that they can magnetically interact, e.g., to provide OIS movement (e.g., movement in one or more directions orthogonal to the optical axis) of the lens group 204 relative to the image sensor 206. In this non-limiting example, the OIS coil(s) 222 may be disposed on a stationary structure that is stationary relative to movement of the lens group 204 in some embodiments.

According to various embodiments, the chassis 202 may at least partially encase the camera. Furthermore, the system 200 may include a stiffener 224 that may at least partially encase the camera. In some embodiments, the chassis 202 may encase a first portion (e.g., an upper portion) of the camera, and the stiffener 224 may encase a second portion (e.g., a lower portion) of the camera. In various embodiments, the first portion and the second portion may overlap in one or more regions at which the stiffener 224 overlaps with the chassis 202 (e.g., region(s) at which the stiffener 224 may be attached to the chassis 202).

In some embodiments, the chassis 202 may include one or more top walls 226 and one or more side walls 228. In some non-limiting examples, the top wall(s) 226 may extend proximate to (e.g., above) the actuator (and/or another portion of the camera) such that the top wall(s) 226 at least partially encase the actuator and the camera from above. Additionally, or alternatively, the side wall(s) 228 may extend proximate to (e.g., alongside) respective sides of the actuator (and/or respective sides of the camera) such that the side wall(s) 228 at least partially encase sides of the actuator and the camera.

In some embodiments, the stiffener 224 may include a base portion 230 and one or more end portions 232. The base portion 230 may extend proximate (e.g., below) to the substrate 208 and/or parallel to the image sensor 206 in some embodiments. The end portion(s) 232 may extend from the base portion 230. Furthermore, each of the end portion(s) 232 may be oriented at a respective non-zero angle relative to the base portion 230. In a non-limiting example, the end portion(s) 232 may be orthogonal to the base portion 230. The base portion 230 may at least partially encase the camera from below. The end portion(s) 232 may extend proximate to (e.g., alongside) respective sides of the camera such that the end portion(s) 232 at least partially encase sides of the camera. According to some non-limiting examples, the stiffener 224 may be considered a folded stiffener that is formed, e.g., by folding a piece of material (e.g., a sheet of metal). In some examples, the piece of material may be cut (e.g., via etching) into a particular shape including the base portion 230 and tabs extending from the base portion 230 that can be folded to form the end portions 232.

According to various embodiments, one or more of the side walls 228 of the chassis 202 may define a respective recess 234 for receiving a respective end portion 232 of the stiffener 224. In some embodiments, a side wall 228 may comprise a first portion 244 having a first wall thickness, and a second portion 250 that extends from the first portion and that has a second wall thickness that is greater than the first wall thickness, e.g., as indicated in FIGS. 2A-2B. For example, the first portion 244 of the side wall 228 may include an exterior surface 242 of the recess 234 to which an end portion 232 of the stiffener 224 may be attached, e.g., via an adhesive 236 disposed within the recess 234 as indicated in FIG. 2B. In some embodiments, the end portion 232 of the stiffener 224 may be biased towards the corresponding side wall 228 to which it is attached. In some non-limiting embodiments, the recess 234 may be sized such that it may contain the adhesive 236, with the end portion 232 of the stiffener 224 being disposed within the recess 234 such that an external surface of the end portion 232 is flush with an exterior surface 252 of the second portion 250 of the side wall 228.

FIG. 2B includes a schematic overlay of an example thermal conduction path 238 of the system 200. The thermal conduction path 238 may represent a path along which heat may be dissipated in some embodiments. As a non-limiting example, heat produced by one or more components (e.g., the image sensor 206, the OIS coil(s) 222, a motor driver 240 for controlling the actuator, etc.) of the camera may travel along the thermal conduction path and be dissipated from the chassis 202 to an environment external to the chassis 202.

As indicated in FIG. 2B, the thermal conduction path 238 may include heat transferring from the stiffener 224 to the chassis 202 via the adhesive 236 disposed within the recess 234. In various embodiments, the adhesive 236 disposed within the recess 234 may be the only intervening material, in the heat conduction path 238, between the stiffener 224 and the chassis 202. In some other systems (e.g., in which the shield can and the chassis are formed separately, as discussed above), an adhesive layer would be used to attach the shield can to the chassis, meaning that such other systems would include at least two additional intervening materials (e.g., the separately formed shield can and the adhesive used to attach it to the chassis) to the corresponding thermal conduction path. Compared to those other systems, the thermal conduction path 238 of the system 200 may be shortened, as the chassis 202 may comprise one or more integrated shield can-chassis portions, thus eliminating the need for the separately formed shield can and the additional adhesive layer of the other systems. The shortened thermal conduction path 238 may improve thermal performance of the system 200 compared to other systems having the longer thermal conduction path.

Figure 3:
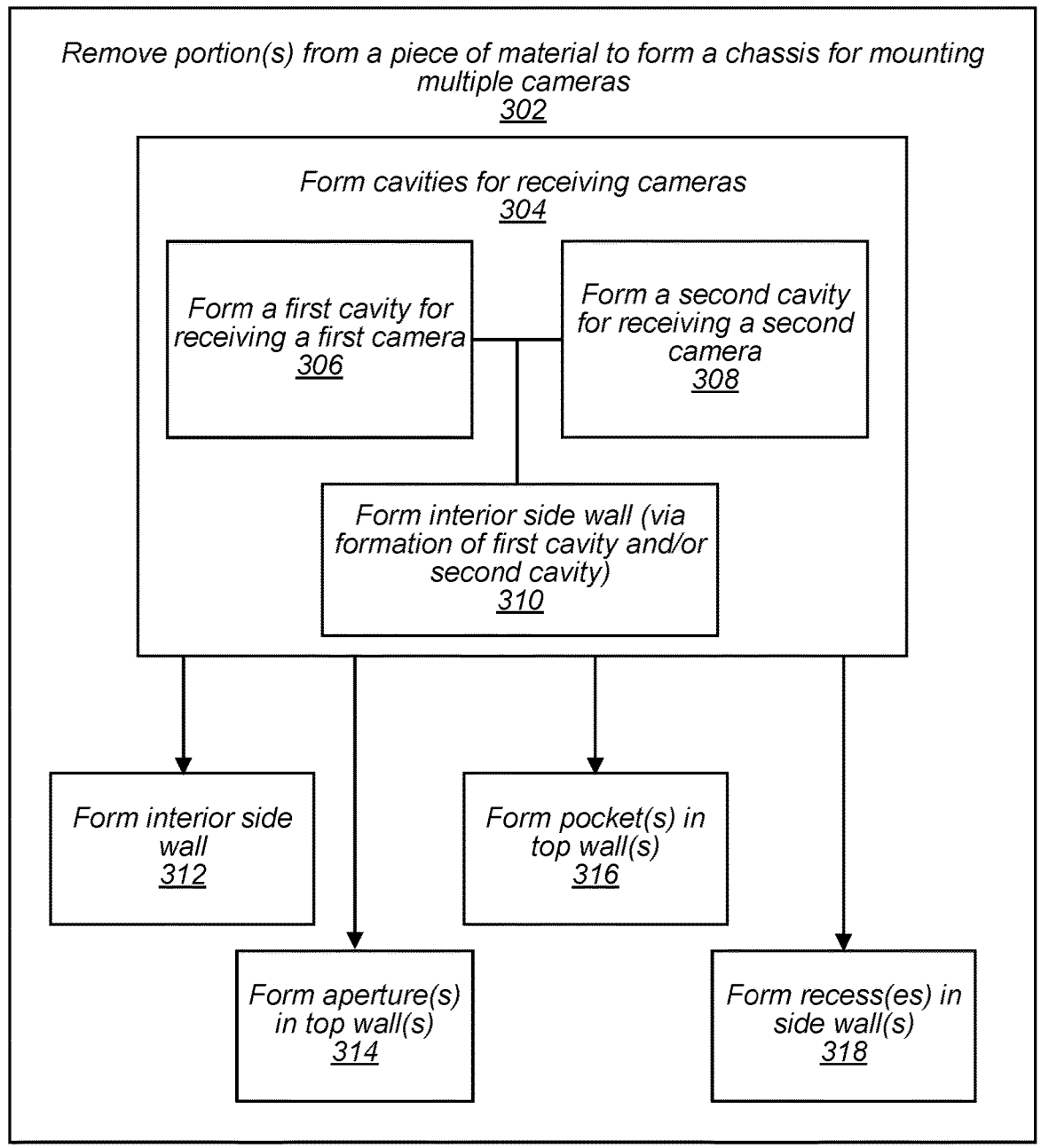
FIG. 3 is a flow chart of an example method for manufacturing a chassis for mounting multiple cameras, in accordance with some embodiments.

FIG. 3 is a flow chart of an example method 300 for manufacturing a chassis (e.g. which may include one or more features of the chassis 102 described herein with reference to FIGS. 1A-1E and/or the chassis 202 described herein with reference to FIGS. 2A-2B) for mounting multiple cameras, in accordance with some embodiments. It should be understood that the operations of the method 300 are not necessarily performed in the order in which they are described. That is, the operations of the method 300 may be performed in one or more different orders in accordance with various implementations. Furthermore, it should be understood that one or more of the operations described herein may be omitted in some implementations. Similarly, it should be understood that the operations described herein are not an exhaustive list of operations that may be included in the method 300. It is contemplated that fewer or additional (and/or different) operations than those described herein may be performed in various embodiments.

At 302, the method 300 may include removing portions(s) from a piece of material to form the chassis for mounting multiple cameras. In various implementations, the method 300 may include one or more operations of removing material from a same piece of material, e.g., via subtractive manufacturing such as (but not limited to) CNC machining.

According to various examples, at 304, the method 300 may include forming cavities for receiving cameras. In some implementations, at 306, the method 300 may include removing material, from the piece of material, to form a first cavity for receiving a first camera. For example, the first cavity may be at least partially defined by a first top wall and a first set of side walls of a first chassis portion. The first chassis portion may be structured to partially encase the first camera when the first camera is mounted to the chassis. In some implementations, at 308, the method 300 may include removing material, from the piece of material, to form a second cavity for receiving a second camera. For example, the second cavity may be at least partially defined by a second top wall and a second set of side walls of a second chassis portion. The second chassis portion may be structured to partially encase the second camera when the second camera is mounted to the chassis. In some embodiments, the first top wall may have a different wall thickness relative to the second top wall.

At 310, the method 300 may include forming an interior side wall, e.g., via formation of the first cavity (at 306) and/or formation of the second cavity (at 308), according to some implementations. In some examples, a portion of the interior side wall may be formed as a result of forming the first cavity (at 306) and/or forming the second cavity (at 308), and one or more features (e.g., recess(es), pocket(s), protrusion(s), etc.) may be defined on the interior side wall in another material removal operation, e.g., at 312, where the method 300 may include removing material, from the piece of material, to form at least a portion of the interior side wall. In some embodiments, the interior side wall may have a different wall thickness relative to at least one side wall of the first set of side walls and/or relative to at least one side wall of the second set of side walls.

At 314, the method 300 may include forming aperture(s) in the top wall(s). For example, a first aperture may be formed in the first top wall that partially defines the first cavity, and a second aperture may be formed in the second top wall that partially defines the second cavity. The first aperture may be configured to receive at least a portion of the first camera (e.g., a lens barrel of the first camera). The second aperture may be configured to receive at least a portion of the second camera (e.g., a lens barrel of the second camera).

At 316, the method 300 may include forming pocket(s) in the top wall(s). For example, the pocket(s) may be configured to accommodate at least a portion of an actuator of the first camera and/or the second camera in some embodiments. According to some examples, a pocket may be defined by one or more interior surfaces of a top wall. The interior surface(s) may be opposite at least one exterior surface of the top wall.

At 318, the method 300 may include forming recess(es) in side wall(s). For example, material may be removed, from the piece of material, to form a recess defined by a side wall of the first set of side walls or the second set of side walls, such that a first portion of the side wall has a different wall thickness relative to a second portion of the side wall due to the recess. As described herein with reference to FIGS. 1A-2B, the recess may be configured to receive an end portion of a stiffener that at least partially encases the first camera and/or the second camera. Adhesive may be disposed within the recess to attach the end portion of the stiffener to the chassis.

Multifunction Device Examples

Embodiments of electronic devices, user interfaces for such devices, and associated processes for using such devices are described. In some embodiments, the device is a portable communications device, such as a mobile telephone, that also contains other functions, such as PDA and/or music player functions. Example embodiments of portable multifunction devices include, without limitation, the iPhone®, iPod Touch®, and iPad® devices from Apple Inc. of Cupertino, Calif. Other portable electronic devices, such as laptops, cameras, cell phones, or tablet computers, may also be used. It should also be understood that, in some embodiments, the device is not a portable communications device, but is a desktop computer with a camera. In some embodiments, the device is a gaming computer with orientation sensors (e.g., orientation sensors in a gaming controller). In other embodiments, the device is not a portable communications device, but is a camera.

In the discussion that follows, an electronic device that includes a display and a touch-sensitive surface is described. It should be understood, however, that the electronic device may include one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

Figure 4:
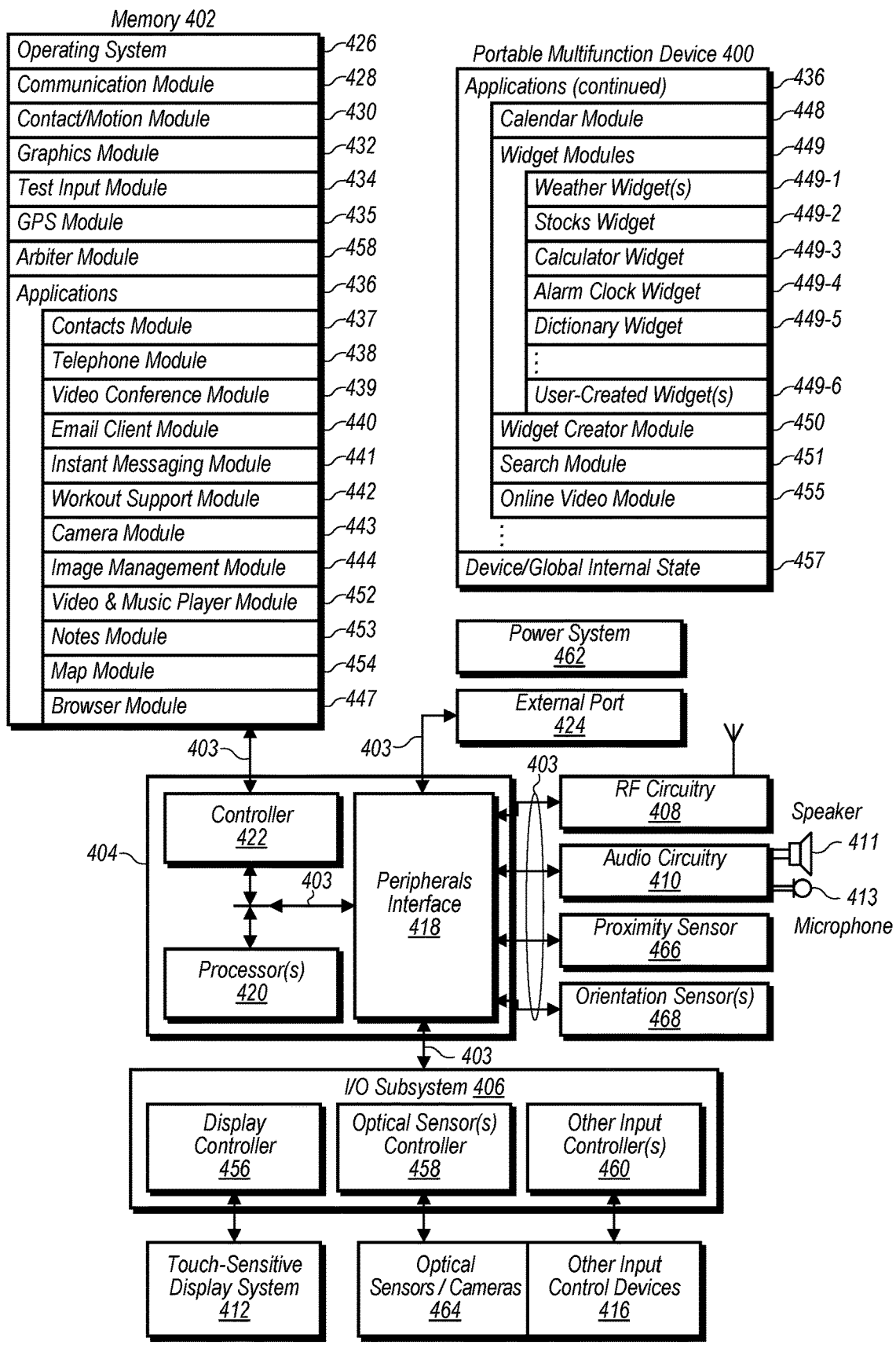
FIG. 4 illustrates a block diagram of a portable multifunction device that may include a chassis for mounting multiple cameras, in accordance with some embodiments.

Attention is now directed toward embodiments of portable devices with cameras. FIG. 4 illustrates a block diagram of an example portable multifunction device 400 that may include a chassis for mounting multiple cameras (e.g., the chassis and/or camera(s) described above with reference to FIGS. 1A-3), in accordance with some embodiments. Cameras 464 are sometimes called "optical sensors" for convenience, and may also be known as or called an optical sensor system. Device 400 may include memory 402 (which may include one or more computer readable storage mediums), memory controller 422, one or more processing units (CPUs) 420, peripherals interface 418, RF circuitry 408, audio circuitry 410, speaker 411, touch-sensitive display system 412, microphone 413, input/output (I/O) subsystem 406, other input or control devices 416, and external port 424. Device 400 may include multiple optical sensors 464. These components may communicate over one or more communication buses or signal lines 403.

It should be appreciated that device 400 is only one example of a portable multifunction device, and that device 400 may have more or fewer components than shown, may combine two or more components, or may have a different configuration or arrangement of the components. The various components shown in FIG. 4 may be implemented in hardware, software, or a combination of hardware and software, including one or more signal processing and/or application specific integrated circuits.

Memory 402 may include high-speed random access memory and may also include non-volatile memory, such as one or more magnetic disk storage devices, flash memory devices, or other non-volatile solid-state memory devices. Access to memory 402 by other components of device 400, such as CPU 420 and the peripherals interface 418, may be controlled by memory controller 422.

Peripherals interface 418 can be used to couple input and output peripherals of the device to CPU 420 and memory 402. The one or more processors 420 run or execute various software programs and/or sets of instructions stored in memory 402 to perform various functions for device 400 and to process data.

In some embodiments, peripherals interface 418, CPU 420, and memory controller 422 may be implemented on a single chip, such as chip 404. In some other embodiments, they may be implemented on separate chips.

RF (radio frequency) circuitry 408 receives and sends RF signals, also called electromagnetic signals. RF circuitry 408 converts electrical signals to/from electromagnetic signals and communicates with communications networks and other communications devices via the electromagnetic signals. RF circuitry 408 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 408 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a variety of communications standards, protocols and technologies, including but not limited to Global System for Mobile Communications (GSM), Enhanced Data GSM Environment (EDGE), high-speed downlink packet access (HSDPA), high-speed uplink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 410, speaker 411, and microphone 413 provide an audio interface between a user and device 400. Audio circuitry 410 receives audio data from peripherals interface 418, converts the audio data to an electrical signal, and transmits the electrical signal to speaker 411. Speaker 411 converts the electrical signal to human-audible sound waves. Audio circuitry 410 also receives electrical signals converted by microphone 413 from sound waves. Audio circuitry 410 converts the electrical signal to audio data and transmits the audio data to peripherals interface 418 for processing. Audio data may be retrieved from and/or transmitted to memory 402 and/or RF circuitry 408 by peripherals interface 418. In some embodiments, audio circuitry 410 also includes a headset jack (e.g., 512, FIG. 5). The headset jack provides an interface between audio circuitry 410 and removable audio input/output peripherals, such as output-only headphones or a headset with both output (e.g., a headphone for one or both ears) and input (e.g., a microphone).

I/O subsystem 406 couples input/output peripherals on device 400, such as touch screen 412 and other input control devices 416, to peripherals interface 418. I/O subsystem 406 may include display controller 456 and one or more input controllers 460 for other input or control devices. The one or more input controllers 460 receive/send electrical signals from/to other input or control devices 416. The other input control devices 416 may include physical buttons (e.g., push buttons, rocker buttons, etc.), dials, slider switches, joysticks, click wheels, and so forth. In some alternate embodiments, input controller(s) 460 may be coupled to any (or none) of the following: a keyboard, infrared port, USB port, and a pointer device such as a mouse. The one or more buttons (e.g., 508, FIG. 5) may include an up/down button for volume control of speaker 411 and/or microphone 413. The one or more buttons may include a push button (e.g., 506, FIG. 5).

Touch-sensitive display 412 provides an input interface and an output interface between the device and a user. Display controller 456 receives and/or sends electrical signals from/to touch screen 412. Touch screen 412 displays visual output to the user. The visual output may include graphics, text, icons, video, and any combination thereof (collectively termed "graphics"). In some embodiments, some or all of the visual output may correspond to user-interface objects.

Touch screen 412 has a touch-sensitive surface, sensor or set of sensors that accepts input from the user based on haptic and/or tactile contact. Touch screen 412 and display controller 456 (along with any associated modules and/or sets of instructions in memory 402) detect contact (and any movement or breaking of the contact) on touch screen 412 and converts the detected contact into interaction with user-interface objects (e.g., one or more soft keys, icons, web pages or images) that are displayed on touch screen 412. In an example embodiment, a point of contact between touch screen 412 and the user corresponds to a finger of the user.

Touch screen 412 may use LCD (liquid crystal display) technology, LPD (light emitting polymer display) technology, or LED (light emitting diode) technology, although other display technologies may be used in other embodiments. Touch screen 412 and display controller 456 may detect contact and any movement or breaking thereof using any of a variety of touch sensing technologies now known or later developed, including but not limited to capacitive, resistive, infrared, and surface acoustic wave technologies, as well as other proximity sensor arrays or other elements for determining one or more points of contact with touch screen 412. In an example embodiment, projected mutual capacitance sensing technology is used, such as that found in the iPhone®, iPod Touch®, and iPad® from Apple Inc. of Cupertino, Calif.

Touch screen 412 may have a video resolution in excess of 800 dpi. In some embodiments, the touch screen has a video resolution of approximately 860 dpi. The user may make contact with touch screen 412 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 400 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 412 or an extension of the touch-sensitive surface formed by the touch screen.

Device 400 also includes power system 462 for powering the various components. Power system 462 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 400 may also include one or more optical sensors or cameras 464. FIG. 4 shows an optical sensor 464 coupled to optical sensor controller 458 in I/O subsystem 406. Optical sensor 464 may include charge-coupled device (CCD) or complementary metal-oxide semiconductor (CMOS) phototransistors. Optical sensor 464 receives light from the environment, projected through one or more lens, and converts the light to data representing an image. In conjunction with imaging module 443 (also called a camera module), optical sensor 464 may capture still images or video. In some embodiments, an optical sensor 464 is located on the back of device 400, opposite touch screen display 412 on the front of the device, so that the touch screen display 412 may be used as a viewfinder for still and/or video image acquisition. In some embodiments, another optical sensor is located on the front of the device so that the user's image may be obtained for videoconferencing while the user views the other video conference participants on the touch screen display.

Device 400 may also include one or more proximity sensors 466. FIG. 4 shows proximity sensor 466 coupled to peripherals interface 418. Alternately, proximity sensor 466 may be coupled to input controller 460 in I/O subsystem 406. In some embodiments, the proximity sensor 466 turns off and disables touch screen 412 when the multifunction device 400 is placed near the user's ear (e.g., when the user is making a phone call).

Device 400 includes one or more orientation sensors 468. In some embodiments, the one or more orientation sensors 468 include one or more accelerometers (e.g., one or more linear accelerometers and/or one or more rotational accelerometers). In some embodiments, the one or more orientation sensors 468 include one or more gyroscopes. In some embodiments, the one or more orientation sensors 468 include one or more magnetometers. In some embodiments, the one or more orientation sensors 468 include one or more of global positioning system (GPS), Global Navigation Satellite System (GLONASS), and/or other global navigation system receivers. The GPS, GLONASS, and/or other global navigation system receivers may be used for obtaining information concerning the location and orientation (e.g., portrait or landscape) of device 400. In some embodiments, the one or more orientation sensors 468 include any combination of orientation/rotation sensors. FIG. 4 shows the one or more orientation sensors 468 coupled to peripherals interface 418. Alternately, the one or more orientation sensors 468 may be coupled to an input controller 460 in I/O subsystem 406. In some embodiments, information is displayed on the touch screen display 412 in a portrait view or a landscape view based on an analysis of data received from the one or more orientation sensors 468.

In some embodiments, the software components stored in memory 402 include operating system 426, communication module (or set of instructions) 428, contact/motion module (or set of instructions) 430, graphics module (or set of instructions) 432, text input module (or set of instructions) 434, Global Positioning System (GPS) module (or set of instructions) 435, arbiter module 458 and applications (or sets of instructions) 436. Furthermore, in some embodiments memory 402 stores device/global internal state 457. Device/global internal state 457 includes one or more of: active application state, indicating which applications, if any, are currently active; display state, indicating what applications, views or other information occupy various regions of touch screen display 412; sensor state, including information obtained from the device's various sensors and input control devices 416; and location information concerning the device's location and/or attitude.

Operating system 426 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 428 facilitates communication with other devices over one or more external ports 424 and also includes various software components for handling data received by RF circuitry 408 and/or external port 424. External port 424 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector.

Contact/motion module 430 may detect contact with touch screen 412 (in conjunction with display controller 456) and other touch sensitive devices (e.g., a touchpad or physical click wheel). Contact/motion module 430 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 430 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 430 and display controller 456 detect contact on a touchpad.

Contact/motion module 430 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 432 includes various known software components for rendering and displaying graphics on touch screen 412 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 432 stores data representing graphics to be used. Each graphic may be assigned a corresponding code. Graphics module 432 receives, from applications etc., one or more codes specifying graphics to be displayed along with, if necessary, coordinate data and other graphic property data, and then generates screen image data to output to display controller 456.

Text input module 434, which may be a component of graphics module 432, provides soft keyboards for entering text in various applications (e.g., contacts 437, e-mail 440, IM 441, browser 447, and any other application that needs text input).

GPS module 435 determines the location of the device and provides this information for use in various applications (e.g., to telephone 438 for use in location-based dialing, to camera 443 as picture/video metadata, and to applications that provide location-based services such as weather widgets, local yellow page widgets, and map/navigation widgets).

Applications 436 may include the following modules (or sets of instructions), or a subset or superset thereof:
- contacts module 437 (sometimes called an address book or contact list);
- telephone module 438;
- video conferencing module 439;
- e-mail client module 440;
- instant messaging (IM) module 441;
- workout support module 442;
- camera module 443 for still and/or video images;
- image management module 444;
- browser module 447;
- calendar module 448;
- widget modules 449, which may include one or more of: weather widget 449-1, stocks widget 449-2, calculator widget 449-3, alarm clock widget 449-4, dictionary widget 449-5, and other widgets obtained by the user, as well as user-created widgets 449-6;
- widget creator module 450 for making user-created widgets 449-6;
- search module 451;
- video and music player module 452, which may be made up of a video player module and a music player module;
- notes module 453;
- map module 454; and/or
- online video module 455.

Examples of other applications 436 that may be stored in memory 402 include other word processing applications, other image editing applications, drawing applications, presentation applications, JAVA-enabled applications, encryption, digital rights management, voice recognition, and voice replication.

In conjunction with touch screen 412, display controller 456, contact module 430, graphics module 432, and text input module 434, contacts module 437 may be used to manage an address book or contact list (e.g., stored in application internal state 457), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 438, video conference 439, e-mail 440, or IM 441; and so forth.

In conjunction with RF circuitry 408, audio circuitry 410, speaker 411, microphone 413, touch screen 412, display controller 456, contact module 430, graphics module 432, and text input module 434, telephone module 438 may be used to enter a sequence of characters corresponding to a telephone number, access one or more telephone numbers in address book 437, modify a telephone number that has been entered, dial a respective telephone number, conduct a conversation and disconnect or hang up when the conversation is completed. As noted above, the wireless communication may use any of a variety of communications standards, protocols and technologies.

In conjunction with RF circuitry 408, audio circuitry 410, speaker 411, microphone 413, touch screen 412, display controller 456, optical sensor 464, optical sensor controller 458, contact module 430, graphics module 432, text input module 434, contact list 437, and telephone module 438, videoconferencing module 439 includes executable instructions to initiate, conduct, and terminate a video conference between a user and one or more other participants in accordance with user instructions.

In conjunction with RF circuitry 408, touch screen 412, display controller 456, contact module 430, graphics module 432, and text input module 434, e-mail client module 440 includes executable instructions to create, send, receive, and manage e-mail in response to user instructions. In conjunction with image management module 444, e-mail client module 440 makes it very easy to create and send e-mails with still or video images taken with camera module 443.

In conjunction with RF circuitry 408, touch screen 412, display controller 456, contact module 430, graphics module 432, and text input module 434, the instant messaging module 441 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 408, touch screen 412, display controller 456, contact module 430, graphics module 432, text input module 434, GPS module 435, map module 454, and music player module 446, workout support module 442 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 412, display controller 456, optical sensor(s) 464, optical sensor controller 458, contact module 430, graphics module 432, and image management module 444, camera module 443 includes executable instructions to capture still images or video (including a video stream) and store them into memory 402, modify characteristics of a still image or video, or delete a still image or video from memory 402.

In conjunction with touch screen 412, display controller 456, contact module 430, graphics module 432, text input module 434, and camera module 443, image management module 444 includes executable instructions to arrange, modify (e.g., edit), or otherwise manipulate, label, delete, present (e.g., in a digital slide show or album), and store still and/or video images.

In conjunction with RF circuitry 408, touch screen 412, display system controller 456, contact module 430, graphics module 432, and text input module 434, browser module 447 includes executable instructions to browse the Internet in accordance with user instructions, including searching, linking to, receiving, and displaying web pages or portions thereof, as well as attachments and other files linked to web pages.

In conjunction with RF circuitry 408, touch screen 412, display system controller 456, contact module 430, graphics module 432, text input module 434, e-mail client module 440, and browser module 447, calendar module 448 includes executable instructions to create, display, modify, and store calendars and data associated with calendars (e.g., calendar entries, to do lists, etc.) in accordance with user instructions.

In conjunction with RF circuitry 408, touch screen 412, display system controller 456, contact module 430, graphics module 432, text input module 434, and browser module 447, widget modules 449 are mini-applications that may be downloaded and used by a user (e.g., weather widget 449-1, stocks widget 449-2, calculator widget 449-3, alarm clock widget 449-4, and dictionary widget 449-5) or created by the user (e.g., user-created widget 449-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 408, touch screen 412, display system controller 456, contact module 430, graphics module 432, text input module 434, and browser module 447, the widget creator module 450 may be used by a user to create widgets (e.g., turning a user-specified portion of a web page into a widget).

In conjunction with touch screen 412, display system controller 456, contact module 430, graphics module 432, and text input module 434, search module 451 includes executable instructions to search for text, music, sound, image, video, and/or other files in memory 402 that match one or more search criteria (e.g., one or more user-specified search terms) in accordance with user instructions.

In conjunction with touch screen 412, display system controller 456, contact module 430, graphics module 432, audio circuitry 410, speaker 411, RF circuitry 408, and browser module 447, video and music player module 452 includes executable instructions that allow the user to download and play back recorded music and other sound files stored in one or more file formats, such as MP3 or AAC files, and executable instructions to display, present or otherwise play back videos (e.g., on touch screen 412 or on an external, connected display via external port 424). In some embodiments, device 400 may include the functionality of an MP3 player.

In conjunction with touch screen 412, display controller 456, contact module 430, graphics module 432, and text input module 434, notes module 453 includes executable instructions to create and manage notes, to do lists, and the like in accordance with user instructions.

In conjunction with RF circuitry 408, touch screen 412, display system controller 456, contact module 430, graphics module 432, text input module 434, GPS module 435, and browser module 447, map module 454 may be used to receive, display, modify, and store maps and data associated with maps (e.g., driving directions; data on stores and other points of interest at or near a particular location; and other location-based data) in accordance with user instructions.

In conjunction with touch screen 412, display system controller 456, contact module 430, graphics module 432, audio circuitry 410, speaker 411, RF circuitry 408, text input module 434, e-mail client module 440, and browser module 447, online video module 455 includes instructions that allow the user to access, browse, receive (e.g., by streaming and/or download), play back (e.g., on the touch screen or on an external, connected display via external port 424), send an e-mail with a link to a particular online video, and otherwise manage online videos in one or more file formats, such as H.264. In some embodiments, instant messaging module 441, rather than e-mail client module 440, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. In some embodiments, memory 402 may store a subset of the modules and data structures identified above. Furthermore, memory 402 may store additional modules and data structures not described above.

In some embodiments, device 400 is a device where operation of a predefined set of functions on the device is performed exclusively through a touch screen and/or a touchpad. By using a touch screen and/or a touchpad as the primary input control device for operation of device 400, the number of physical input control devices (such as push buttons, dials, and the like) on device 400 may be reduced.

The predefined set of functions that may be performed exclusively through a touch screen and/or a touchpad include navigation between user interfaces. In some embodiments, the touchpad, when touched by the user, navigates device 400 to a main, home, or root menu from any user interface that may be displayed on device 400. In such embodiments, the touchpad may be referred to as a "menu button." In some other embodiments, the menu button may be a physical push button or other physical input control device instead of a touchpad.

Figure 5:
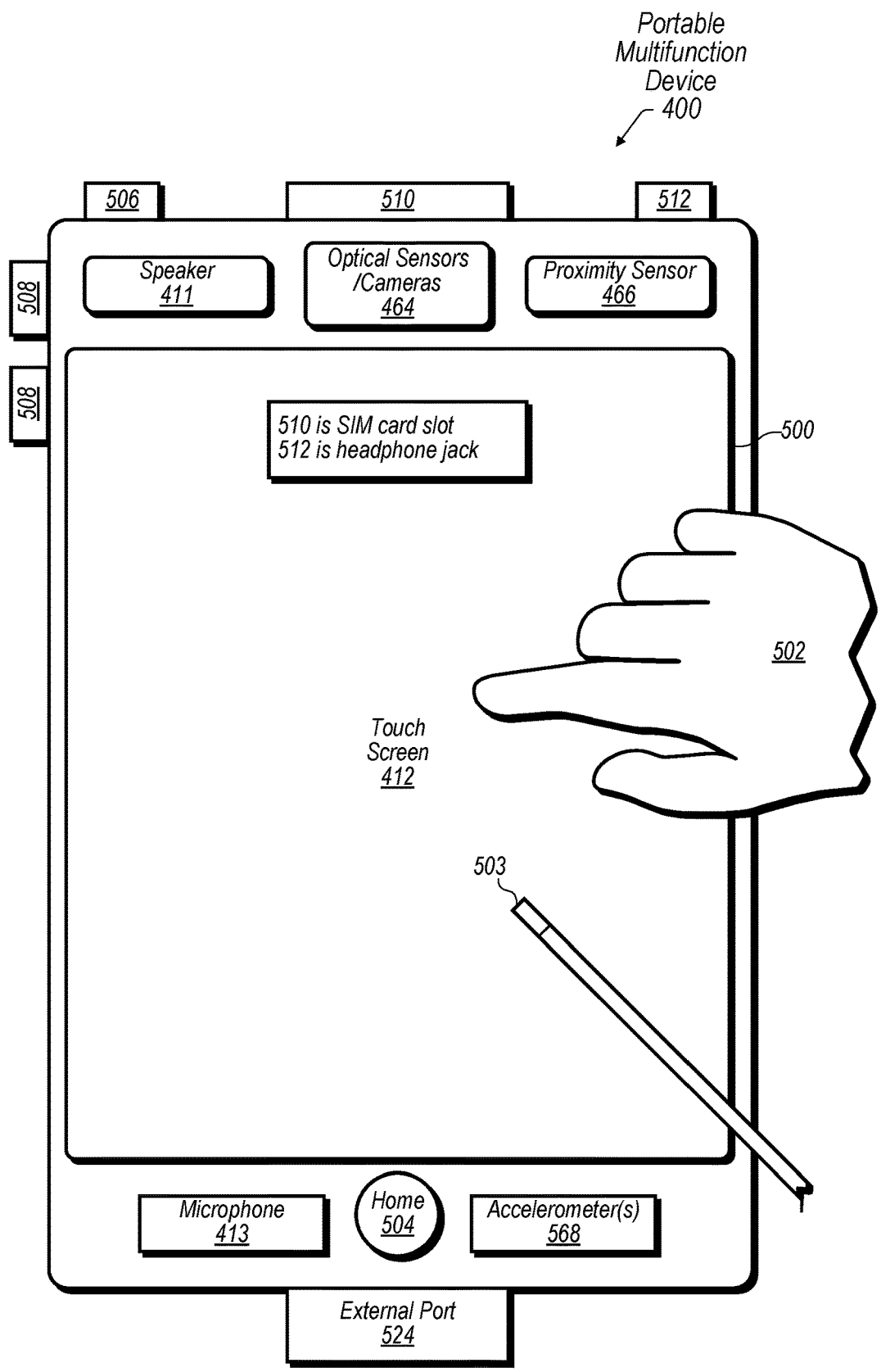
FIG. 5 illustrates a portable multifunction device that may include a chassis for mounting multiple cameras, in accordance with some embodiments.

FIG. 5 depicts illustrates an example portable multifunction device 400 that may include a chassis for mounting multiple cameras (e.g., the chassis and/or camera(s) described above with reference to FIGS. 1A-3), in accordance with some embodiments. The device 400 may have a touch screen 412. The touch screen 412 may display one or more graphics within user interface (UI) 500. In this embodiment, as well as others described below, a user may select one or more of the graphics by making a gesture on the graphics, for example, with one or more fingers 502 (not drawn to scale in the figure) or one or more styluses 503 (not drawn to scale in the figure).

Device 400 may also include one or more physical buttons, such as "home" or menu button 504. As described previously, menu button 504 may be used to navigate to any application 436 in a set of applications that may be executed on device 400. Alternatively, in some embodiments, the menu button 504 is implemented as a soft key in a GUI displayed on touch screen 412.

In one embodiment, device 400 includes touch screen 412, menu button 504, push button 506 for powering the device on/off and locking the device, volume adjustment button(s) 508, Subscriber Identity Module (SIM) card slot 510, head set jack 512, and docking/charging external port 524. Push button 506 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 400 also may accept verbal input for activation or deactivation of some functions through microphone 413.

It should be noted that, although many of the examples herein are given with reference to optical sensor(s)/camera(s) 464 (on the front of a device), one or more rear-facing cameras or optical sensors that are pointed opposite from the display may be used instead of, or in addition to, an optical sensor(s)/camera(s) 464 on the front of a device.

Example Computer System

Figure 6:
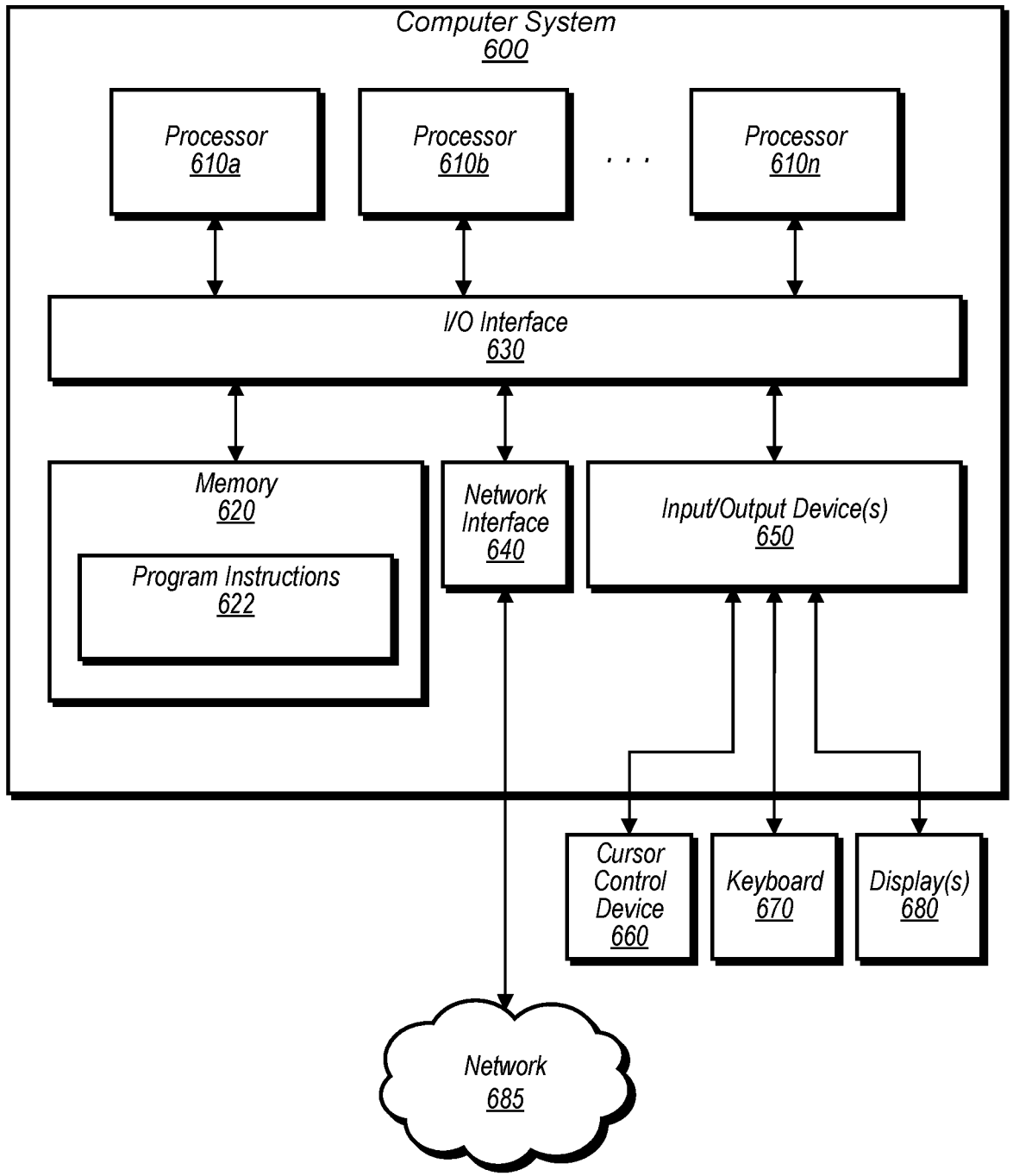
FIG. 6 illustrates an example computer system that may include a chassis for mounting multiple cameras, in accordance with some embodiments.

FIG. 6 illustrates an example computer system 600 that may include a chassis for mounting multiple cameras (e.g., the chassis and/or camera(s) described above with reference to FIGS. 1A-3), according to some embodiments. The computer system 600 may be configured to execute any or all of the embodiments described above. In different embodiments, computer system 600 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device.

Various embodiments of a camera motion control system as described herein, including embodiments of magnetic position sensing, as described herein may be executed in one or more computer systems 600, which may interact with various other devices. Note that any component, action, or functionality described above with respect to FIGS. 1A-5 may be implemented on one or more computers configured as computer system 600 of FIG. 6, according to various embodiments. In the illustrated embodiment, computer system 600 includes one or more processors 610 coupled to a system memory 620 via an input/output (I/O) interface 630. Computer system 600 further includes a network interface 640 coupled to I/O interface 630, and one or more input/output devices 650, such as cursor control device 660, keyboard 670, and display(s) 680. In some cases, it is contemplated that embodiments may be implemented using a single instance of computer system 600, while in other embodiments multiple such systems, or multiple nodes making up computer system 600, may be configured to host different portions or instances of embodiments. For example, in one embodiment some elements may be implemented via one or more nodes of computer system 600 that are distinct from those nodes implementing other elements.

In various embodiments, computer system 600 may be a uniprocessor system including one processor 610, or a multiprocessor system including several processors 610 (e.g., two, four, eight, or another suitable number). Processors 610 may be any suitable processor capable of executing instructions. For example, in various embodiments processors 610 may be general-purpose or embedded processors implementing any of a variety of instruction set architectures (ISAs), such as the x86, PowerPC, SPARC, or MIPS ISAs, or any other suitable ISA. In multiprocessor systems, each of processors 610 may commonly, but not necessarily, implement the same ISA.

System memory 620 may be configured to store camera control program instructions 622 and/or camera control data accessible by processor 610. In various embodiments, system memory 620 may be implemented using any suitable memory technology, such as static random access memory (SRAM), synchronous dynamic RAM (SDRAM), nonvolatile/Flash-type memory, or any other type of memory. In the illustrated embodiment, program instructions 622 may be configured to implement a lens control application 624 incorporating any of the functionality described above. Additionally, existing camera control data 632 of memory 620 may include any of the information or data structures described above. In some embodiments, program instructions and/or data may be received, sent or stored upon different types of computer-accessible media or on similar media separate from system memory 620 or computer system 600. While computer system 600 is described as implementing the functionality of functional blocks of previous Figures, any of the functionality described herein may be implemented via such a computer system.

In one embodiment, I/O interface 630 may be configured to coordinate I/O traffic between processor 610, system memory 620, and any peripheral devices in the device, including network interface 640 or other peripheral interfaces, such as input/output devices 650. In some embodiments, I/O interface 630 may perform any necessary protocol, timing or other data transformations to convert data signals from one component (e.g., system memory 620) into a format suitable for use by another component (e.g., processor 610). In some embodiments, I/O interface 630 may include support for devices attached through various types of peripheral buses, such as a variant of the Peripheral Component Interconnect (PCI) bus standard or the Universal Serial Bus (USB) standard, for example. In some embodiments, the function of I/O interface 630 may be split into two or more separate components, such as a north bridge and a south bridge, for example. Also, in some embodiments some or all of the functionality of I/O interface 630, such as an interface to system memory 620, may be incorporated directly into processor 610.

Network interface 640 may be configured to allow data to be exchanged between computer system 600 and other devices attached to a network 685 (e.g., carrier or agent devices) or between nodes of computer system 600. Network 685 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 640 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 650 may, in some embodiments, include one or more display terminals, keyboards, keypads, touchpads, scanning devices, voice or optical recognition devices, or any other devices suitable for entering or accessing data by one or more computer systems 600. Multiple input/output devices 650 may be present in computer system 600 or may be distributed on various nodes of computer system 600. In some embodiments, similar input/output devices may be separate from computer system 600 and may interact with one or more nodes of computer system 600 through a wired or wireless connection, such as over network interface 640.

As shown in FIG. 6, memory 620 may include program instructions 622, which may be processor-executable to implement any element or action described above. In one embodiment, the program instructions may implement the methods described above. In other embodiments, different elements and data may be included. Note that data may include any data or information described above.

Those skilled in the art will appreciate that computer system 600 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 600 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 600 may be transmitted to computer system 600 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations.

Additional Descriptions of Embodiments (Example Clauses)

Clause 1: A chassis for mounting multiple cameras, the chassis comprising: a first chassis portion, comprising: a first top wall defining a first aperture; and a first set of side walls that extend from the first top wall; wherein the first top wall and the first set of side walls define a first cavity for receiving at least a portion of a first camera, such that the first chassis portion partially encases the first camera when the first camera is mounted to the chassis; a second chassis portion, comprising: a second top wall defining a second aperture; and a second set of side walls that extend from the second top wall; wherein the second top wall and the second set of side walls define a second cavity for receiving at least a portion of a second camera, such that the second chassis portion partially encases the second camera when the second camera is mounted to the chassis; and an interior side wall, located between the first cavity and the second cavity, that is shared by the first chassis portion and the second chassis portion.

Clause 2: The chassis of Clause 1, wherein the first set of side walls comprises: an exterior side wall defining a recess for receiving an end portion of a stiffener to connect the stiffener to the chassis.

Clause 3: The chassis of Clause 2, wherein the exterior side wall comprises: a first portion having a first wall thickness, wherein the first portion comprises an exterior surface of the recess to which the end portion of the stiffener is attached; and a second portion extending from the first portion, the second portion having a second wall thickness that is greater than the first wall thickness.

Clause 4: The chassis of any of Clauses 2 or 3, wherein: the exterior side wall is a first exterior side wall; the recess is a first recess for receiving a first end portion of the stiffener; and the first set of side walls further comprises: a second exterior side wall opposite the first exterior side wall, the second exterior side wall defining a second recess for receiving a second end portion of the stiffener.

Clause 5: The chassis of any of Clauses 1-4, wherein: the first set of side walls comprises: a first exterior side wall; and a second exterior side wall opposite the first exterior side wall; the interior side wall extends from the first exterior side wall to the second exterior side wall; and the interior side wall has a different wall thickness relative to at least one of the first exterior side wall or the second exterior side wall.

Clause 6: The chassis of any of Clauses 1-5, wherein the first top wall has a different wall thickness relative to the second top wall.

Clause 7: The chassis of any of Clauses 1-6, wherein the chassis is monolithic.

Clause 8: A system, comprising: a first camera; a second camera; a stiffener that at least partially encases the first camera; and a chassis to which at least the first camera and the second camera are mounted, the chassis comprising: a first chassis portion, comprising: a first top wall defining a first aperture; and a first set of side walls that extend from the first top wall, at least one side wall of the first set of side walls defining a respective recess within which a respective end portion of the stiffener is at least partially disposed and connected to the chassis; wherein the first top wall and the first set of side walls define a first cavity within which at least a portion of the first camera is disposed, such that the first chassis portion partially encases the first camera; and a second chassis portion, comprising: a second top wall defining a second aperture; and a second set of side walls that extend from the second top wall; wherein the second top wall and the second set of side walls define a second cavity within which at least a portion of the second camera is disposed, such that the second chassis portion partially encases the second camera.

Clause 9: The system of Clause 8, wherein the chassis further comprises: an interior side wall, located between the first cavity and the second cavity, that is shared by the first chassis portion and the second chassis portion.

Clause 10: The system of Clause 9, wherein the interior side wall defines one or more pockets for an adhesive to be introduced to gaps between surfaces disposed within at least one of the first cavity or the second cavity.

Clause 11: The system of any of Clauses 8-10, wherein the at least one side wall comprises: a first side wall defining a first recess within which a first end portion of the stiffener is at least partially disposed and connected to the chassis, wherein the first end portion is biased in a first direction towards the first side wall; and a second side wall defining a second recess within which a second end portion of the stiffener is at least partially disposed and connected to the chassis, wherein the second end portion is biased in a second direction towards the second side wall, and wherein the second direction is opposite the first direction.

Clause 12: The system of any of Clauses 8-11, wherein: the first camera comprises: a lens group comprising one or more lens elements; an image sensor to capture light that has passed through the first lens group; and a substrate to which the image sensor is attached; and the stiffener comprises: a base portion that extends proximate to the substrate and parallel to the image sensor; and one or more end portions that extend from the base portion and that are oriented at a respective non-zero angle relative to the base portion, the one or more end portions comprising the respective end portion at least partially disposed within the respective recess.

Clause 13: The system of any of Clauses 8-12, wherein: the first camera comprises: a lens group comprising one or more lens elements; an image sensor to capture light that has passed through the first aperture and the first lens group; and an actuator to move at least one of the lens group or the image sensor; and one or more interior surfaces of the first top wall define a pocket that accommodates at least a portion of the actuator, the one or more interior surfaces opposite at least one exterior surface that blocks light from passing to the image sensor.

Clause 14: The system of any of Clauses 8-13, wherein there is no shield can between the first chassis portion and the first camera.

Clause 15: The system of any of Clauses 8-14, wherein: heat produced by one or more components of the first camera travels along a thermal conduction path and is dissipated from the chassis to an environment external to the chassis; the respective end portion of the stiffener is attached to the at least one side wall via adhesive disposed within the respective recess; and the adhesive disposed within the respective recess is the only intervening material, in the thermal conduction path, between the stiffener and the chassis.

Clause 16: A method of manufacturing a chassis for mounting multiple cameras, the method comprising: removing material, from a piece of material, to form a first cavity that is at least partially defined by a first top wall and a first set of side walls of a first chassis portion, the first cavity for receiving at least a portion of a first camera, such that the first chassis portion is structured to partially encase the first camera when the first camera is mounted to the chassis; removing material, from the piece of material, to form a second cavity that is at least partially defined by a second top wall and a second set of side walls of a second chassis portion, the second cavity for receiving at least a portion of a second camera, such that the second chassis portion is structured to partially encase the second camera when the second camera is mounted to the chassis; and removing material, from the piece of material, to form a recess defined by a side wall, of the first set of side walls or the second set of side walls, such that a first portion of the side wall has a different wall thickness relative to a second portion of the side wall due to the recess.

Clause 17: The method of Clause 16, wherein the removing material to form the first cavity and the removing material to form the second cavity comprise: forming, via subtractive manufacturing, an interior side wall located between the first cavity and the second cavity, wherein the interior side wall is shared by the first chassis portion and the second chassis portion, and wherein the interior side wall has a different wall thickness relative to at least one side wall of the first set of side walls.

Clause 18: The method of any of Clauses 16 or 17, further comprising: removing material, from the piece of material, to form a first aperture defined by the first top wall; and removing material, from the piece of material, to form a second aperture defined by the second top wall.

Clause 19: The method of any of Clauses 16-18, further comprising: removing material, from the piece of material, to form a pocket for accommodating at least a portion of an actuator of the first camera, wherein the pocket is defined by one or more interior surfaces of the first top wall, and wherein the one or more interior surfaces are opposite at least one exterior surface of the first top wall.

Clause 20: The method of any of Clauses 16-19, wherein the removing material to form the first cavity and the removing material to form the second cavity comprise: forming the first cavity and forming the second cavity such that the first top wall has a different wall thickness relative to the second top wall.

Clause 21: A device, comprising: one or more processors; memory storing program instructions executable by the one or more processors to control operation of at least one of a first camera or a second camera; the first camera; the second camera; a stiffener that at least partially encases the first camera; and a chassis to which at least the first camera and the second camera are mounted, the chassis comprising: a first chassis portion, comprising: a first top wall defining a first aperture; and a first set of side walls that extend from the first top wall, at least one side wall of the first set of side walls defining a respective recess within which a respective end portion of the stiffener is at least partially disposed and connected to the chassis; wherein the first top wall and the first set of side walls define a first cavity within which at least a portion of the first camera is disposed, such that the first chassis portion partially encases the first camera; and a second chassis portion, comprising: a second top wall defining a second aperture; and a second set of side walls that extend from the second top wall; wherein the second top wall and the second set of side walls define a second cavity within which at least a portion of the second camera is disposed, such that the second chassis portion partially encases the second camera.

Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A chassis for mounting multiple cameras, the chassis comprising:
    a first chassis portion, comprising:
        a first top wall defining a first aperture; and
        a first set of side walls that extend from the first top wall;
        wherein the first top wall and the first set of side walls define a first cavity for receiving at least a portion of a first camera, such that the first chassis portion partially encases the first camera when the first camera is mounted to the chassis;
        wherein the first chassis portion is configured to serve as a shield can to at least partially shield at least a portion of an actuator when the actuator is situated within the first chassis portion, the actuator configured to adjust a portion of the first camera when the actuator and the first camera are situated within the first chassis portion;
    a second chassis portion, comprising:
        a second top wall defining a second aperture; and
        a second set of side walls that extend from the second top wall;
        wherein the second top wall and the second set of side walls define a second cavity for receiving at least a portion of a second camera, such that the second chassis portion partially encases the second camera when the second camera is mounted to the chassis; and
    an interior side wall, located between the first cavity and the second cavity, that is shared by the first chassis portion and the second chassis portion.

2. The chassis of claim 1, wherein the first set of side walls comprises:
    an exterior side wall defining a recess for receiving an end portion of a stiffener to connect the stiffener to the chassis.

3. The chassis of claim 2, wherein the exterior side wall comprises:
    a first portion having a first wall thickness, wherein the first portion comprises an exterior surface of the recess to which the end portion of the stiffener is attached; and a second portion extending from the first portion, the second portion having a second wall thickness that is greater than the first wall thickness.

4. The chassis of claim 2, wherein:
the exterior side wall is a first exterior side wall;
the recess is a first recess for receiving a first end portion of the stiffener; and
the first set of side walls further comprises:
  a second exterior side wall opposite the first exterior side wall, the second exterior side wall defining a second recess for receiving a second end portion of the stiffener.

5. The chassis of claim 1, wherein:
the first set of side walls comprises:
  a first exterior side wall; and
  a second exterior side wall opposite the first exterior side wall;
the interior side wall extends from the first exterior side wall to the second exterior side wall; and
the interior side wall has a different wall thickness relative to at least one of the first exterior side wall or the second exterior side wall.

6. The chassis of claim 1, wherein the first top wall has a different wall thickness relative to the second top wall.

7. The chassis of claim 1, wherein the chassis is monolithic.

8. A system, comprising:
a first camera;
a second camera;
a stiffener that at least partially encases the first camera; and
a chassis to which at least the first camera and the second camera are mounted, the chassis comprising:
  a first chassis portion, comprising:
    a first top wall defining a first aperture; and
    a first set of side walls that extend from the first top wall, at least one side wall of the first set of side walls comprising a first side wall that comprises a respective first portion having a respective first wall thickness and a respective second portion having a respective second wall thickness, the first and second portions defining a respective recess within which a respective end portion of the stiffener is at least partially disposed and connected to the chassis, and a second side wall of the first set of side walls defining another respective recess within which a second end portion of the stiffener is at least partially disposed and connected to the chassis;
    wherein the first top wall and the first set of side walls define a first cavity within which at least a portion of the first camera is disposed, such that the first chassis portion partially encases the first camera; and
  a second chassis portion, comprising:
    a second top wall defining a second aperture; and
    a second set of side walls that extend from the second top wall;
    wherein the second top wall and the second set of side walls define a second cavity within which at least a portion of the second camera is disposed, such that the second chassis portion partially encases the second camera.

9. The system of claim 8, wherein the chassis further comprises:
an interior side wall, located between the first cavity and the second cavity, that is shared by the first chassis portion and the second chassis portion.

10. The system of claim 9, wherein the interior side wall defines one or more pockets for an adhesive to be introduced to gaps between surfaces disposed within at least one of the first cavity or the second cavity.

11. The system of claim 8, wherein the at least one side wall comprises:
the first side wall defining a first recess within which a first end portion of the stiffener is at least partially disposed and connected to the chassis, wherein the first end portion is biased in a first direction towards the first side wall; and
the second side wall defining a second recess within which a second end portion of the stiffener is at least partially disposed and connected to the chassis, wherein the second end portion is biased in a second direction towards the second side wall, and wherein the second direction is opposite the first direction.

12. The system of claim 8, wherein:
the first camera comprises:
  a lens group comprising one or more lens elements;
  an image sensor to capture light that has passed through the lens group; and
  a substrate to which the image sensor is attached; and
the stiffener comprises:
  a base portion that extends proximate to the substrate and parallel to the image sensor; and
  one or more end portions that extend from the base portion and that are oriented at a respective non-zero angle relative to the base portion, the one or more end portions comprising the respective end portion at least partially disposed within the respective recess.

13. The system of claim 8, wherein:
the first camera comprises:
  a lens group comprising one or more lens elements;
  an image sensor to capture light that has passed through the first aperture and the lens group; and
  an actuator to move at least one of the lens group or the image sensor; and
one or more interior surfaces of the first top wall define a pocket that accommodates at least a portion of the actuator, the one or more interior surfaces opposite at least one exterior surface that blocks light from passing to the image sensor.

14. The system of claim 8, wherein there is no shield can between the first chassis portion and the first camera.

15. The system of claim 8, wherein:
heat produced by one or more components of the first camera travels along a thermal conduction path and is dissipated from the chassis to an environment external to the chassis;
the respective end portion of the stiffener is attached to the at least one side wall via adhesive disposed within the respective recess; and
the adhesive disposed within the respective recess is the only intervening material, in the thermal conduction path, between the stiffener and the chassis.

16. A method of manufacturing a chassis for mounting multiple cameras, the method comprising:
removing material, from a piece of material, to form a first cavity that is at least partially defined by a first top wall and a first set of side walls of a first chassis portion, the first cavity for receiving at least a portion of a first camera, such that the first chassis portion is structured to partially encase the first camera when the first camera is mounted to the chassis;

removing material, from the piece of material, to form a second cavity that is at least partially defined by a second top wall and a second set of side walls of a second chassis portion, the second cavity for receiving at least a portion of a second camera, such that the second chassis portion is structured to partially encase the second camera when the second camera is mounted to the chassis; and removing material, from the piece of material, to form a recess defined by a side wall, of the first set of side walls or the second set of side walls, such that a first portion of the side wall has a different wall thickness relative to a second portion of the side wall due to the recess.

17. The method of claim 16, wherein the removing material to form the first cavity and the removing material to form the second cavity comprise:

forming, via subtractive manufacturing, an interior side wall located between the first cavity and the second cavity, wherein the interior side wall is shared by the first chassis portion and the second chassis portion, and wherein the interior side wall has a different wall thickness relative to at least one side wall of the first set of side walls.

18. The method of claim 16, further comprising:

removing material, from the piece of material, to form a first aperture defined by the first top wall; and removing material, from the piece of material, to form a second aperture defined by the second top wall.

19. The method of claim 16, further comprising:

removing material, from the piece of material, to form a pocket for accommodating at least a portion of an actuator of the first camera, wherein the pocket is defined by one or more interior surfaces of the first top wall, and wherein the one or more interior surfaces are opposite at least one exterior surface of the first top wall.

20. The method of claim 16, wherein the removing material to form the first cavity and the removing material to form the second cavity comprise:

forming the first cavity and forming the second cavity such that the first top wall has a different wall thickness relative to the second top wall.

21. A device, comprising:

one or more processors;

memory storing program instructions executable by the one or more processors to control operation of at least one of a first camera or a second camera;

the first camera;

the second camera;

a stiffener that at least partially encases the first camera; and a chassis to which at least the first camera and the second camera are mounted, the chassis comprising:

a first chassis portion, comprising:

a first top wall defining a first aperture; and a first set of side walls that extend from the first top wall, at least one side wall of the first set of side walls comprising a respective first portion having a respective first wall thickness and a respective second portion having a respective second wall thickness, the respective first and second portions defining a respective recess within which a respective end portion of the stiffener is at least partially disposed and connected to the chassis;

wherein the first top wall and the first set of side walls define a first cavity within which at least a portion of the first camera is disposed, such that the first chassis portion partially encases the first camera; and a second chassis portion, comprising:

a second top wall defining a second aperture; and a second set of side walls that extend from the second top wall;

wherein the second top wall and the second set of side walls define a second cavity within which at least a portion of the second camera is disposed, such that the second chassis portion partially encases the second camera.

* * * * *